(12) United States Patent
Holz et al.

(10) Patent No.: US 12,730,519 B2
(45) Date of Patent: Sep. 8, 2026

(54) DIFFERENTIATING A DETECTED OBJECT FROM A BACKGROUND USING A GAUSSIAN BRIGHTNESS FALLOFF PATTERN

(71) Applicant: SIM IP HXR LLC, Sunny Isles Beach, FL (US)

(72) Inventors: David S. Holz, San Francisco, CA (US); Hua Yang, Millbrae, CA (US)

(73) Assignee: SIM IP HXR LLC, Sunny Isles Beach, FL (US)

( * ) Notice: Subject to any disclaimer, the term of this patent is extended or adjusted under 35 U.S.C. 154(b) by 132 days.

(21) Appl. No.: 18/780,192

(22) Filed: Jul. 22, 2024

(65) Prior Publication Data

US 2025/0021169 A1 Jan. 16, 2025

Related U.S. Application Data

(63) Continuation of application No. 18/369,768, filed on Sep. 18, 2023, now Pat. No. 12,086,327, which is a
(Continued)

(51) Int. Cl.
*G06F 3/01* (2006.01)
*G06F 3/03* (2006.01)
(Continued)

(52) U.S. Cl.
CPC ............ *G06F 3/017* (2013.01); *G06F 3/0304* (2013.01); *G06T 7/10* (2017.01); *G06T 7/11* (2017.01);
(Continued)

(58) Field of Classification Search
CPC ......... G06F 3/017; G06F 3/0304; G06T 7/10; G06T 7/11; G06T 7/194; G06T 7/215;
(Continued)

(56) References Cited

U.S. PATENT DOCUMENTS 2,665,041 A 1/1954 Maffucci
3,064,704 A 11/1962 Fabien
(Continued)

FOREIGN PATENT DOCUMENTS

BE 1014643 A3 2/2004
CA 2479564 C 7/2009
(Continued)

OTHER PUBLICATIONS

Devasena et al., “Controlling of Electronic Equipment Using Gesture Recognition”, International Journal of Engineering and Advanced Technology (IJEAT), vol. 3, Iss. 2, Dec. 2013, 4 pages.
(Continued)

*Primary Examiner* — Mia M Thomas
(74) *Attorney, Agent, or Firm* — ALSTON & BIRD LLP

(57) ABSTRACT

A method for detecting a finger is provided. The method includes obtaining a plurality of digital images including a first digital image captured by a camera from a field of view containing a background and a hand including at least one finger, and obtaining an identification of pixels of the plurality of digital images that correspond to at least one finger that is visible in the plurality of digital images rather than to the background, the pixels being identified by: obtaining, from the digital images, a Gaussian brightness falloff pattern indicative of at least one finger, identifying an axis of the at least one finger based on the obtained Gaussian brightness falloff pattern indicative of the at least one finger without identifying edges of the at least one finger, and identifying the pixels that correspond to the at least one finger based on the identified axis.

20 Claims, 8 Drawing Sheets

Related U.S. Application Data continuation of application No. 17/693,200, filed on Mar. 11, 2022, now Pat. No. 11,782,516, which is a continuation of application No. 16/916,034, filed on Jun. 29, 2020, now Pat. No. 11,308,711, which is a continuation of application No. 16/525,475, filed on Jul. 29, 2019, now Pat. No. 10,699,155, which is a continuation of application No. 15/937,717, filed on Mar. 27, 2018, now Pat. No. 10,366,308, which is a continuation of application No. 15/586,048, filed on May 3, 2017, now Pat. No. 9,934,580, which is a continuation of application No. 15/349,864, filed on Nov. 11, 2016, now Pat. No. 9,652,668, which is a continuation of application No. 14/959,891, filed on Dec. 4, 2015, now Pat. No. 9,672,441, which is a continuation of application No. 14/106,148, filed on Dec. 13, 2013, now Pat. No. 9,626,591, which is a continuation of application No. 13/742,845, filed on Jan. 16, 2013, now Pat. No. 8,693,731, which is a continuation-in-part of application No. 13/724,357, filed on Dec. 21, 2012, now Pat. No. 9,070,019, which is a continuation-in-part of application No. 13/414,485, filed on Mar. 7, 2012, now abandoned.

(60) Provisional application No. 61/724,068, filed on Nov. 8, 2012, provisional application No. 61/724,091, filed on Nov. 8, 2012, provisional application No. 61/587,554, filed on Jan. 17, 2012.

(51) Int. Cl.

| | |
|---|---|
| ***G06T 7/10*** | (2017.01) |
| ***G06T 7/11*** | (2017.01) |
| ***G06T 7/194*** | (2017.01) |
| ***G06T 7/215*** | (2017.01) |
| ***G06T 7/246*** | (2017.01) |
| ***G06T 7/254*** | (2017.01) |
| ***G06T 7/262*** | (2017.01) |
| ***G06T 7/33*** | (2017.01) |
| ***G06T 7/37*** | (2017.01) |
| ***G06T 7/70*** | (2017.01) |
| ***G06T 7/90*** | (2017.01) |
| ***G06V 20/64*** | (2022.01) |
| ***G06V 40/10*** | (2022.01) |
| ***H04N 13/254*** | (2018.01) |
| ***H04N 23/661*** | (2023.01) |

(52) U.S. Cl.

CPC .............. *G06T 7/194* (2017.01); *G06T 7/215* (2017.01); *G06T 7/248* (2017.01); *G06T 7/251* (2017.01); *G06T 7/254* (2017.01); *G06T 7/262* (2017.01); *G06T 7/344* (2017.01); *G06T 7/37* (2017.01); *G06T 7/70* (2017.01); *G06T 7/90* (2017.01); *G06V 20/64* (2022.01); *G06V 40/107* (2022.01); *H04N 13/254* (2018.05); *H04N 23/661* (2023.01); *G06T 2200/04* (2013.01); *G06T 2207/10012* (2013.01); *G06T 2207/10016* (2013.01)

(58) Field of Classification Search

CPC ......... G06T 7/248; G06T 7/251; G06T 7/254; G06T 7/262; G06T 7/344; G06T 7/37; G06T 7/70; G06T 7/90; G06T 2200/04; G06T 2207/10012; G06T 2207/10016; G06V 20/64; G06V 40/107; H04N 13/254; H04N 23/661

See application file for complete search history.

(56) References Cited

U.S. PATENT DOCUMENTS

| | | | |
|---|---|---|---|
| 3,638,989 | A | 2/1972 | Sandquist |
| 3,768,022 | A | 10/1973 | Lang |
| 4,175,862 | A | 11/1979 | DiMatteo et al. |
| 4,631,676 | A | 12/1986 | Pugh |
| 4,876,455 | A | 10/1989 | Sanderson et al. |
| 4,879,659 | A | 11/1989 | Bowlin et al. |
| 4,891,749 | A | 1/1990 | Hoffman et al. |
| 4,893,223 | A | 1/1990 | Arnold |
| 4,894,551 | A | 1/1990 | Kishimoto et al. |
| 5,038,258 | A | 8/1991 | Koch et al. |
| 5,109,435 | A | 4/1992 | Lo et al. |
| 5,134,661 | A | 7/1992 | Reinsch |
| 5,282,067 | A | 1/1994 | Liu |
| 5,333,297 | A | 7/1994 | Lemaire et al. |
| 5,434,617 | A | 7/1995 | Bianchi |
| 5,454,043 | A | 9/1995 | Freeman |
| 5,538,013 | A | 7/1996 | Brannon |
| 5,574,511 | A | 11/1996 | Yang et al. |
| 5,581,276 | A | 12/1996 | Cipolla et al. |
| 5,594,469 | A | 1/1997 | Freeman et al. |
| 5,610,674 | A | 3/1997 | Martin |
| 5,613,071 | A | 3/1997 | Rankin et al. |
| 5,659,475 | A | 8/1997 | Brown |
| 5,691,737 | A | 11/1997 | Ito et al. |
| 5,734,590 | A | 3/1998 | Tebbe |
| 5,739,797 | A | 4/1998 | Karasawa et al. |
| 5,742,263 | A | 4/1998 | Wang et al. |
| 5,883,969 | A | 3/1999 | Le Gouzouguec et al. |
| 5,900,863 | A | 5/1999 | Numazaki |
| 5,901,170 | A | 5/1999 | Peysakhovich et al. |
| 5,940,282 | A | 8/1999 | Oglesbee |
| 5,940,538 | A | 8/1999 | Spiegel et al. |
| 5,940,828 | A | 8/1999 | Anaya et al. |
| 5,983,909 | A | 11/1999 | Yeol et al. |
| 5,995,770 | A | 11/1999 | Rochford et al. |
| 6,002,808 | A | 12/1999 | Freeman |
| 6,016,510 | A | 1/2000 | Quattromani et al. |
| 6,031,161 | A | 2/2000 | Baltenberger |
| 6,031,568 | A | 2/2000 | Wakitani |
| 6,031,661 | A | 2/2000 | Tanaami |
| 6,072,494 | A | 6/2000 | Nguyen |
| 6,075,610 | A | 6/2000 | Ueda et al. |
| 6,075,892 | A | 6/2000 | Fan et al. |
| 6,075,895 | A | 6/2000 | Qiao et al. |
| 6,101,420 | A | 8/2000 | Vandoren et al. |
| 6,147,678 | A | 11/2000 | Kumar et al. |
| 6,154,558 | A | 11/2000 | Hsieh |
| 6,181,343 | B1 | 1/2001 | Lyons |
| 6,184,326 | B1 | 2/2001 | Razavi et al. |
| 6,184,926 | B1 | 2/2001 | Khosravi et al. |
| 6,195,104 | B1 | 2/2001 | Lyons |
| 6,204,852 | B1 | 3/2001 | Kumar et al. |
| 6,252,598 | B1 | 6/2001 | Segen |
| 6,256,033 | B1 | 7/2001 | Nguyen |
| 6,256,400 | B1 | 7/2001 | Takata et al. |
| 6,263,091 | B1 | 7/2001 | Jain et al. |
| 6,266,061 | B1 | 7/2001 | Doi et al. |
| 6,296,358 | B1 | 10/2001 | Cornsweet et al. |
| 6,298,143 | B1 | 10/2001 | Kikuchi et al. |
| 6,346,933 | B1 | 2/2002 | Lin |
| 6,417,866 | B1 | 7/2002 | Man et al. |
| 6,417,970 | B1 | 7/2002 | Travers et al. |
| 6,421,453 | B1 | 7/2002 | Kanevsky et al. |
| 6,463,402 | B1 | 10/2002 | Bennett et al. |
| 6,492,986 | B1 | 12/2002 | Metaxas et al. |
| 6,493,041 | B1 | 12/2002 | Hanko et al. |
| 6,498,628 | B2 | 12/2002 | Iwamura |
| 6,515,669 | B1 | 2/2003 | Mohri |
| 6,578,203 | B1 | 6/2003 | Anderson, Jr. et al. |
| 6,597,801 | B1 | 7/2003 | Cham et al. |
| 6,602,475 | B1 | 8/2003 | Chiao |
| 6,603,867 | B1 | 8/2003 | Sugino et al. |
| 6,629,065 | B1 | 9/2003 | Gadh et al. |
| 6,661,918 | B1 | 12/2003 | Gordon et al. |
| 6,674,877 | B1 | 1/2004 | Jojic et al. |

(56) References Cited

U.S. PATENT DOCUMENTS 6,702,494 B2 3/2004 Dumler et al.
6,734,911 B1 5/2004 Lyons
6,738,424 B1 5/2004 Allmen et al.
6,738,871 B2 5/2004 Van et al.
6,751,698 B1 6/2004 Deneroff et al.
6,758,215 B2 7/2004 Begum
6,771,294 B1 8/2004 Pulli et al.
6,798,628 B1 9/2004 Macbeth
6,804,654 B2 10/2004 Kobylevsky et al.
6,804,656 B1 10/2004 Rosenfeld et al.
6,814,656 B2 11/2004 Rodriguez
6,819,796 B2 11/2004 Hong et al.
6,857,004 B1 2/2005 Howard et al.
6,901,170 B1 5/2005 Terada et al.
6,919,880 B2 7/2005 Morrison et al.
6,925,547 B2 8/2005 Scott et al.
6,931,146 B2 8/2005 Aoki et al.
6,950,534 B2 9/2005 Cohen et al.
6,981,074 B2 12/2005 Oner et al.
6,993,157 B1 1/2006 Oue et al.
7,136,205 B1 11/2006 Kaye
7,149,356 B2 12/2006 Clark et al.
7,152,024 B2 12/2006 Marschner et al.
7,210,066 B2 4/2007 Mandava et al.
7,213,707 B2 5/2007 Hubbs et al.
7,215,828 B2 5/2007 Luo
7,219,178 B2 5/2007 Harris et al.
7,236,611 B2 6/2007 Roberts et al.
7,244,233 B2 7/2007 Krantz et al.
7,257,237 B1 8/2007 Luck et al.
7,259,873 B2 8/2007 Sikora et al.
7,292,250 B2 11/2007 Sepulveda
7,308,112 B2 12/2007 Fujimura et al.
7,333,648 B2 2/2008 Edic et al.
7,340,077 B2 3/2008 Gokturk et al.
7,372,977 B2 5/2008 Fujimura et al.
7,443,869 B2 10/2008 Solomon et al.
7,472,047 B2 12/2008 Kramer et al.
7,483,049 B2 1/2009 Aman et al.
7,519,223 B2 4/2009 Dehlin et al.
7,532,206 B2 5/2009 Morrison et al.
7,536,032 B2 5/2009 Bell
7,542,586 B2 6/2009 Johnson
7,598,942 B2 10/2009 Underkoffler et al.
7,603,658 B2 10/2009 Subramanian et al.
7,606,417 B2 10/2009 Steinberg et al.
7,646,372 B2 1/2010 Marks et al.
7,650,434 B2 1/2010 Blumrich et al.
7,656,372 B2 2/2010 Sato et al.
7,660,439 B1 2/2010 Lu et al.
7,665,041 B2 2/2010 Wilson et al.
7,692,625 B2 4/2010 Morrison et al.
7,769,994 B2 8/2010 Peles
7,831,088 B2 11/2010 Frakes et al.
7,831,932 B2 11/2010 Josephsoon et al.
7,840,031 B2 11/2010 Albertson et al.
7,861,188 B2 12/2010 Josephsoon et al.
7,868,887 B1 1/2011 Yhann
7,886,229 B2 2/2011 Pachet
7,886,236 B2 2/2011 Kolmykov-Zotov et al.
7,940,885 B2 5/2011 Stanton et al.
7,948,493 B2 5/2011 Klefenz et al.
7,958,182 B2 6/2011 Arimilli et al.
7,958,183 B2 6/2011 Arimilli et al.
7,961,174 B1 6/2011 Markovic et al.
7,961,934 B2 6/2011 Thrun et al.
7,971,156 B2 6/2011 Albertson et al.
7,980,885 B2 7/2011 Gattwinkel et al.
8,005,263 B2 8/2011 Fujimura et al.
8,023,698 B2 9/2011 Niwa et al.
8,023,726 B2 9/2011 Sundaresan et al.
8,035,624 B2 10/2011 Bell et al.
8,045,825 B2 10/2011 Shimoyama et al.
8,059,153 B1 11/2011 Barreto et al.
8,059,894 B1 11/2011 Flagg et al.
8,064,704 B2 11/2011 Kim et al.
8,085,339 B2 12/2011 Marks
8,086,971 B2 12/2011 Radivojevic et al.
8,107,687 B2 1/2012 Gold, Jr.
8,111,239 B2 2/2012 Pryor et al.
8,112,719 B2 2/2012 Hsu et al.
8,116,527 B2 2/2012 Sabol et al.
8,144,233 B2 3/2012 Fukuyama
8,149,210 B2 4/2012 Klier et al.
8,159,536 B2 4/2012 Wang et al.
8,180,114 B2 5/2012 Nishihara et al.
8,185,176 B2 5/2012 Mangat et al.
8,213,707 B2 7/2012 Li et al.
8,218,858 B2 7/2012 Gu
8,229,134 B2 7/2012 Duraiswami et al.
8,230,852 B2 7/2012 Zhang et al.
8,235,529 B1 8/2012 Raffle et al.
8,239,866 B2 8/2012 Carrie
8,244,233 B2 8/2012 Chang et al.
8,249,345 B2 8/2012 Wu et al.
8,253,564 B2 8/2012 Lee et al.
8,270,669 B2 9/2012 Aichi et al.
8,281,286 B2 10/2012 Nguyen
8,289,162 B2 10/2012 Mooring et al.
8,290,208 B2 10/2012 Kurtz et al.
8,296,734 B2 10/2012 Geppert et al.
8,304,727 B2 11/2012 Lee et al.
8,319,832 B2 11/2012 Nagata et al.
8,325,993 B2 12/2012 Dinerstein et al.
8,351,651 B2 1/2013 Lee
8,363,010 B2 1/2013 Nagata
8,395,600 B2 3/2013 Kawashima et al.
8,405,680 B1 3/2013 Cardoso et al.
8,423,962 B2 4/2013 Becker et al.
8,432,377 B2 4/2013 Newton
8,457,353 B2 6/2013 Reville et al.
8,458,267 B2 6/2013 Chen et al.
8,471,848 B2 6/2013 Tschesnok
8,497,842 B2 7/2013 Tomkins et al.
8,514,221 B2 8/2013 King et al.
8,542,320 B2 9/2013 Berestov et al.
8,553,037 B2 10/2013 Smith et al.
8,561,036 B1 10/2013 Beans et al.
8,567,395 B2 10/2013 Savona et al.
8,582,809 B2 11/2013 Halimeh et al.
8,593,417 B2 11/2013 Kawashima et al.
8,605,202 B2 12/2013 Muijs et al.
8,620,024 B2 12/2013 Huang et al.
8,631,355 B2 1/2014 Murillo et al.
8,632,182 B2 1/2014 Chen et al.
8,638,989 B2 1/2014 Holz
8,643,628 B1 2/2014 Eriksson et al.
8,659,594 B2 2/2014 Kim et al.
8,659,658 B2 2/2014 Vassigh et al.
8,686,943 B1 4/2014 Rafii
8,693,731 B2 4/2014 Holz et al.
8,719,788 B2 5/2014 Merry
8,723,789 B1 5/2014 Rafii
8,724,906 B2 5/2014 Shotton et al.
8,738,181 B2 5/2014 Greer et al.
8,738,523 B1 5/2014 Sanchez et al.
8,744,122 B2 6/2014 Salgian et al.
8,751,979 B1 6/2014 Socha
8,768,022 B2 7/2014 Miga et al.
8,773,512 B1 7/2014 Rafii
8,781,234 B2 7/2014 Zhang et al.
8,786,596 B2 7/2014 House
8,803,885 B1 8/2014 Carron
8,817,087 B2 8/2014 Weng et al.
8,824,749 B2 9/2014 Leyvand et al.
8,836,768 B1 9/2014 Rafii et al.
8,842,084 B2 9/2014 Andersson et al.
8,843,857 B2 9/2014 Berkes et al.
8,854,433 B1 10/2014 Rafii
8,872,914 B2 10/2014 Gobush
8,878,749 B1 11/2014 Wu et al.
8,879,835 B2 11/2014 Krishnaswamy et al.
8,891,868 B1 11/2014 Ivanchenko
8,902,224 B2 12/2014 Wyeld

(56) References Cited

U.S. PATENT DOCUMENTS 8,907,982 B2 12/2014 Zontrop et al.
8,917,239 B2 12/2014 Eriksson et al.
8,922,590 B1 12/2014 Luckett, Jr. et al.
8,924,656 B1 12/2014 Usgaonkar et al.
8,929,609 B2 1/2015 Padovani et al.
8,930,852 B2 1/2015 Chen et al.
8,942,881 B2 1/2015 Hobbs et al.
8,954,340 B2 2/2015 Sanchez et al.
8,957,857 B2 2/2015 Lee et al.
8,958,631 B2 2/2015 Kutliroff et al.
9,014,414 B2 4/2015 Katano et al.
9,056,396 B1 6/2015 Linnell
9,058,122 B1 6/2015 Nesbit et al.
9,063,574 B1 6/2015 Ivanchenko
9,070,019 B2 6/2015 Holz
9,076,257 B2 7/2015 Sharma et al.
9,110,860 B2 8/2015 Shahar
9,119,670 B2 9/2015 Yang et al.
9,122,354 B2 9/2015 Sharma
9,123,175 B1 9/2015 Goldenthal et al.
9,123,176 B2 9/2015 Lu et al.
9,124,778 B1 9/2015 Crabtree
9,135,503 B2 9/2015 Sundaresan et al.
9,152,603 B1 10/2015 Kelly, III
9,153,028 B2 10/2015 Holz
9,164,702 B1 10/2015 Nesbit et al.
9,170,674 B2 10/2015 Forutanpour et al.
9,182,812 B2 11/2015 Ybanez Zepeda
9,182,838 B2 11/2015 Kikkeri
9,229,901 B1 1/2016 Nesbit et al.
9,244,880 B2 1/2016 Philip et al.
9,274,742 B2 3/2016 Phillips
9,285,893 B2 3/2016 Holz
9,305,229 B2 4/2016 Delean et al.
9,317,924 B2 4/2016 Aratani et al.
9,329,691 B2 5/2016 Izumi
9,330,313 B2 5/2016 Jung et al.
9,342,160 B2 5/2016 Bailey et al.
9,389,779 B2 7/2016 Anderson et al.
9,392,196 B2 7/2016 Holz
9,400,548 B2 7/2016 Zhang et al.
9,436,288 B2 9/2016 Holz
9,436,998 B2 9/2016 Holz
9,448,634 B1 9/2016 Wakeford et al.
9,459,697 B2 10/2016 Bedikian et al.
9,495,221 B2 11/2016 Kramer
9,495,613 B2 11/2016 Holz et al.
9,501,152 B2 11/2016 Bedikian et al.
9,552,075 B2 1/2017 Holz
9,600,935 B2 3/2017 Cohen
9,626,591 B2 4/2017 Holz et al.
9,646,201 B1 5/2017 Horowitz
9,652,668 B2 5/2017 Holz et al.
9,672,441 B2 6/2017 Holz et al.
9,702,977 B2 7/2017 Holz
9,712,383 B2 7/2017 Lu et al.
9,721,383 B1 8/2017 Horowitz et al.
9,766,855 B2 9/2017 Lapidot et al.
9,767,370 B1 9/2017 Lo et al.
9,857,868 B2 1/2018 Plagemann et al.
9,874,977 B1 1/2018 Soyannwo et al.
9,927,522 B2 3/2018 Holz
9,927,880 B2 3/2018 Holz
9,934,580 B2 4/2018 Holz et al.
9,934,609 B2 4/2018 Horowitz et al.
9,945,660 B2 4/2018 Holz
10,007,350 B1 6/2018 Holz et al.
10,042,430 B2 8/2018 Bedikian et al.
10,088,924 B1 10/2018 Ivanchenko
10,210,382 B2 2/2019 Shotton et al.
10,228,242 B2 3/2019 Abovitz et al.
10,254,849 B2 4/2019 Holz
10,281,987 B1 5/2019 Yang et al.
10,346,685 B2 7/2019 Ding et al.
10,366,308 B2 7/2019 Holz et al.
10,395,385 B2 8/2019 Zhou et al.
10,404,938 B1 9/2019 De Benoist et al.
10,445,593 B1 10/2019 Mathiesen et al.
10,445,881 B2 10/2019 Spizhevoy et al.
10,459,530 B2 10/2019 Holz
10,585,193 B2 3/2020 Holz
10,607,413 B1 3/2020 Marcolina et al.
10,620,709 B2 4/2020 Holz
10,656,720 B1 5/2020 Holz
10,691,219 B2 6/2020 Holz
10,699,155 B2 6/2020 Holz et al.
10,739,862 B2 8/2020 Bedikian et al.
10,767,982 B2 9/2020 Holz
10,768,708 B1 9/2020 Sills et al.
10,776,639 B2 9/2020 Steinberg et al.
10,831,281 B2 11/2020 Yang et al.
10,846,942 B1 11/2020 Horowitz et al.
10,901,519 B2 1/2021 Holz
11,178,384 B2 11/2021 Nakamura et al.
11,194,404 B2 12/2021 Holz
11,231,581 B2 * 1/2022 Jia ............................ G02F 1/29
11,353,962 B2 6/2022 Bedikian et al.
11,429,194 B2 8/2022 Holz
11,461,966 B1 10/2022 Horowitz et al.
11,493,998 B2 11/2022 Holz
11,561,519 B2 1/2023 Gordon et al.
11,567,578 B2 1/2023 Yang et al.
11,693,115 B2 7/2023 Holz
11,720,180 B2 8/2023 Holz
11,720,181 B2 8/2023 Holz
11,740,705 B2 8/2023 Bedikian et al.
11,868,687 B2 1/2024 Holz et al.
11,874,970 B2 1/2024 Bedikian et al.
11,994,377 B2 5/2024 Holz
12,045,394 B2 7/2024 Holz
12,379,787 B2 8/2025 Holz
2001/0044858 A1 11/2001 Rekimoto
2001/0052985 A1 12/2001 Ono
2002/0008139 A1 1/2002 Albertelli
2002/0008211 A1 1/2002 Kask
2002/0021287 A1 2/2002 Tomasi et al.
2002/0041327 A1 4/2002 Hildreth et al.
2002/0063740 A1 5/2002 Forlenza et al.
2002/0080094 A1 6/2002 Biocca et al.
2002/0105484 A1 8/2002 Navab et al.
2002/0140665 A1 10/2002 Gordon
2002/0179866 A1 12/2002 Hoeller et al.
2003/0053658 A1 3/2003 Pavlidis
2003/0053659 A1 3/2003 Pavlidis et al.
2003/0081141 A1 5/2003 Mazzapica
2003/0097650 A1 5/2003 Bahrs et al.
2003/0123703 A1 7/2003 Pavlidis et al.
2003/0152289 A1 8/2003 Luo
2003/0156756 A1 8/2003 Gokturk et al.
2003/0202697 A1 10/2003 Simard et al.
2003/0210262 A1 11/2003 Gahm et al.
2004/0046736 A1 3/2004 Pryor et al.
2004/0068409 A1 4/2004 Tanaka et al.
2004/0078493 A1 4/2004 Blumrich et al.
2004/0103111 A1 5/2004 Miller et al.
2004/0125228 A1 7/2004 Dougherty
2004/0125984 A1 7/2004 Ito et al.
2004/0128584 A1 7/2004 Mandava et al.
2004/0141162 A1 7/2004 Olbrich
2004/0145809 A1 7/2004 Brenner
2004/0155877 A1 8/2004 Hong et al.
2004/0212725 A1 10/2004 Raskar
2005/0007673 A1 1/2005 Chaoulov et al.
2005/0068518 A1 3/2005 Baney et al.
2005/0094019 A1 5/2005 Grosvenor et al.
2005/0097300 A1 5/2005 Gildea et al.
2005/0131607 A1 6/2005 Breed
2005/0156888 A1 7/2005 Xie et al.
2005/0166163 A1 7/2005 Chang et al.
2005/0168461 A1 8/2005 Acosta et al.
2005/0168578 A1 8/2005 Gobush
2005/0193291 A1 9/2005 Subramanian et al.
2005/0210105 A1 9/2005 Hirata et al.
2005/0210419 A1 9/2005 Kela et al.

(56) References Cited

U.S. PATENT DOCUMENTS

2005/0229159 A1 10/2005 Haba et al.
2005/0236558 A1 10/2005 Nabeshima et al.
2005/0238201 A1 10/2005 Shamaie
2005/0271279 A1 12/2005 Fujimura et al.
2006/0006235 A1 1/2006 Kurzweil et al.
2006/0017807 A1 1/2006 Lee et al.
2006/0028656 A1 2/2006 Venkatesh et al.
2006/0029296 A1 2/2006 King et al.
2006/0033713 A1 2/2006 Pryor
2006/0034545 A1 2/2006 Mattes et al.
2006/0050979 A1 3/2006 Kawahara
2006/0072105 A1 4/2006 Wagner
2006/0098899 A1 5/2006 King et al.
2006/0111878 A1 5/2006 Pendyala et al.
2006/0204040 A1 9/2006 Freeman et al.
2006/0210112 A1 9/2006 Cohen et al.
2006/0262421 A1 11/2006 Matsumoto et al.
2006/0268285 A1 11/2006 Karabassi et al.
2006/0290950 A1 12/2006 Platt et al.
2007/0014466 A1 1/2007 Baldwin
2007/0018966 A1 1/2007 Blythe et al.
2007/0042346 A1 2/2007 Weller
2007/0057764 A1 3/2007 Sato et al.
2007/0066394 A1 3/2007 Ikeda et al.
2007/0076224 A1 4/2007 Alexander
2007/0086621 A1 4/2007 Aggarwal et al.
2007/0124702 A1 5/2007 Morisaki
2007/0130547 A1 6/2007 Boillot
2007/0203904 A1 8/2007 Ren et al.
2007/0206719 A1 9/2007 Suryanarayanan et al.
2007/0211023 A1 9/2007 Boillot
2007/0230929 A1 10/2007 Niwa et al.
2007/0234127 A1 10/2007 Nguyen
2007/0236475 A1 10/2007 Wherry
2007/0238956 A1 10/2007 Haras et al.
2007/0268316 A1 11/2007 Kajita et al.
2007/0275755 A1 11/2007 Chae et al.
2008/0002860 A1 1/2008 Super et al.
2008/0005703 A1 1/2008 Radivojevic et al.
2008/0009412 A1* 1/2008 Funada ................ B42D 25/328
503/227
2008/0013826 A1 1/2008 Hillis et al.
2008/0019576 A1 1/2008 Senftner et al.
2008/0019589 A1 1/2008 Yoon et al.
2008/0030429 A1 2/2008 Hailpern et al.
2008/0031492 A1 2/2008 Lanz
2008/0056752 A1 3/2008 Denton et al.
2008/0059131 A1 3/2008 Tokita et al.
2008/0059915 A1 3/2008 Boillot
2008/0064954 A1 3/2008 Adams et al.
2008/0106637 A1 5/2008 Nakao et al.
2008/0106746 A1 5/2008 Shpunt et al.
2008/0110994 A1 5/2008 Knowles et al.
2008/0111710 A1 5/2008 Boillot
2008/0113756 A1 5/2008 Williams et al.
2008/0118091 A1 5/2008 Serfaty et al.
2008/0126937 A1 5/2008 Pachet
2008/0141181 A1 6/2008 Ishigaki et al.
2008/0150913 A1 6/2008 Bell et al.
2008/0152875 A1* 6/2008 Tomita ...................... B44C 1/17
428/424.8
2008/0170776 A1 7/2008 Albertson et al.
2008/0174547 A1 7/2008 Kanevsky et al.
2008/0174550 A1 7/2008 Laurila et al.
2008/0175507 A1 7/2008 Lookingbill et al.
2008/0186475 A1 8/2008 Kawata et al.
2008/0187175 A1 8/2008 Kim et al.
2008/0244468 A1 10/2008 Nishihara et al.
2008/0246759 A1 10/2008 Summers
2008/0247462 A1 10/2008 Demos
2008/0273764 A1 11/2008 Scholl
2008/0278589 A1 11/2008 Thorn
2008/0291160 A1 11/2008 Rabin
2008/0300055 A1 12/2008 Lutnick et al.
2008/0304740 A1 12/2008 Sun et al.
2008/0317292 A1 12/2008 Baker et al.
2008/0319356 A1 12/2008 Cain et al.
2009/0002489 A1 1/2009 Yang et al.
2009/0063815 A1 3/2009 Arimilli et al.
2009/0073117 A1 3/2009 Tsurumi et al.
2009/0093307 A1 4/2009 Miyaki
2009/0102840 A1 4/2009 Li
2009/0103780 A1 4/2009 Nishihara et al.
2009/0109178 A1 4/2009 Kim et al.
2009/0116742 A1 5/2009 Nishihara
2009/0122146 A1 5/2009 Zalewski et al.
2009/0128564 A1 5/2009 Okuno
2009/0139778 A1 6/2009 Butler et al.
2009/0153655 A1 6/2009 Ike et al.
2009/0184920 A1 7/2009 Francis
2009/0203993 A1 8/2009 Mangat et al.
2009/0203994 A1 8/2009 Mangat et al.
2009/0217211 A1 8/2009 Hildreth et al.
2009/0239587 A1 9/2009 Negron et al.
2009/0256817 A1 10/2009 Perlin et al.
2009/0257623 A1 10/2009 Tang et al.
2009/0274339 A9 11/2009 Cohen et al.
2009/0309710 A1 12/2009 Kakinami
2009/0313606 A1 12/2009 Geppert et al.
2010/0001998 A1 1/2010 Mandella et al.
2010/0013662 A1 1/2010 Stude
2010/0013832 A1 1/2010 Xiao et al.
2010/0014781 A1 1/2010 Liu et al.
2010/0020078 A1 1/2010 Shpunt
2010/0023015 A1 1/2010 Park
2010/0026963 A1 2/2010 Faulstich
2010/0027845 A1 2/2010 Kim et al.
2010/0046842 A1 2/2010 Conwell
2010/0049836 A1 2/2010 Kramer
2010/0053164 A1 3/2010 Imai et al.
2010/0053209 A1 3/2010 Rauch et al.
2010/0053612 A1 3/2010 Ou-Yang et al.
2010/0058252 A1 3/2010 Ko
2010/0066676 A1 3/2010 Kramer et al.
2010/0066737 A1 3/2010 Liu
2010/0066975 A1 3/2010 Rehnstrom
2010/0091110 A1 4/2010 Hildreth
2010/0095206 A1 4/2010 Kim
2010/0102570 A1 4/2010 Boyd-Wilson et al.
2010/0103106 A1 4/2010 Chui
2010/0117963 A1 5/2010 Westerman et al.
2010/0118123 A1 5/2010 Freedman et al.
2010/0121189 A1 5/2010 Ma et al.
2010/0125815 A1 5/2010 Wang et al.
2010/0127995 A1 5/2010 Rigazio et al.
2010/0131850 A1 5/2010 Berus
2010/0141762 A1 6/2010 Siann et al.
2010/0156676 A1 6/2010 Mooring et al.
2010/0158372 A1 6/2010 Kim et al.
2010/0162165 A1 6/2010 Addala et al.
2010/0177042 A1 7/2010 Chen
2010/0177049 A1 7/2010 Levy et al.
2010/0177929 A1 7/2010 Kurtz et al.
2010/0182136 A1 7/2010 Pryor
2010/0194863 A1 8/2010 Lopes et al.
2010/0199221 A1 8/2010 Yeung et al.
2010/0199229 A1 8/2010 Kipman et al.
2010/0199230 A1 8/2010 Latta et al.
2010/0199232 A1 8/2010 Mistry et al.
2010/0201880 A1 8/2010 Iwamura
2010/0208942 A1 8/2010 Porter et al.
2010/0219934 A1 9/2010 Matsumoto
2010/0222102 A1 9/2010 Rodriguez
2010/0225588 A1 9/2010 Newton et al.
2010/0225745 A1 9/2010 Chen et al.
2010/0229155 A1 9/2010 Adiyapatham et al.
2010/0231512 A1 9/2010 Perez et al.
2010/0235786 A1 9/2010 Maizels et al.
2010/0245289 A1 9/2010 Svajda
2010/0248836 A1 9/2010 Suzuki et al.
2010/0262822 A1 10/2010 Honjo
2010/0264833 A1 10/2010 Van Endert et al.
2010/0275159 A1 10/2010 Matsubara et al.
2010/0275208 A1 10/2010 Carrie

(56) References Cited

U.S. PATENT DOCUMENTS

2010/0277411 A1 11/2010 Yee et al.
2010/0278393 A1 11/2010 Snook et al.
2010/0281434 A1 11/2010 Schroder et al.
2010/0283739 A1 11/2010 Zhang et al.
2010/0295772 A1 11/2010 Alameh et al.
2010/0295773 A1 11/2010 Alameh et al.
2010/0296698 A1 11/2010 Lien et al.
2010/0302015 A1 12/2010 Kipman et al.
2010/0302357 A1 12/2010 Hsu et al.
2010/0303298 A1 12/2010 Marks et al.
2010/0306712 A1 12/2010 Snook et al.
2010/0306713 A1 12/2010 Geisner et al.
2010/0309097 A1 12/2010 Raviv et al.
2010/0321289 A1 12/2010 Kim et al.
2010/0321377 A1 12/2010 Gay et al.
2010/0325590 A1 12/2010 Homma et al.
2010/0329509 A1 12/2010 Fahn et al.
2011/0007072 A1 1/2011 Khan et al.
2011/0018795 A1 1/2011 Jang
2011/0025818 A1 2/2011 Gallmeier et al.
2011/0026765 A1 2/2011 Ivanich et al.
2011/0035666 A1 2/2011 Geisner et al.
2011/0043806 A1 2/2011 Guetta et al.
2011/0057875 A1 3/2011 Shigeta et al.
2011/0066984 A1 3/2011 Li
2011/0080337 A1 4/2011 Matsubara et al.
2011/0080470 A1 4/2011 Kuno et al.
2011/0080490 A1 4/2011 Clarkson et al.
2011/0088014 A1 4/2011 Becker et al.
2011/0090407 A1 4/2011 Friedman
2011/0093820 A1 4/2011 Zhang et al.
2011/0096033 A1 4/2011 Ko
2011/0107216 A1 5/2011 Bi
2011/0113083 A1 5/2011 Shahar
2011/0115486 A1 5/2011 Frohlich et al.
2011/0116684 A1 5/2011 Coffman et al.
2011/0119640 A1 5/2011 Berkes et al.
2011/0134112 A1 6/2011 Koh et al.
2011/0134251 A1 6/2011 Kim et al.
2011/0148875 A1 6/2011 Kim et al.
2011/0157483 A1* 6/2011 Reichow .............. H04N 9/3197 348/E3.012
2011/0163976 A1 7/2011 Barnhoefer et al.
2011/0169726 A1 7/2011 Holmdahl et al.
2011/0169760 A1 7/2011 Largillier
2011/0173204 A1 7/2011 Murillo et al.
2011/0173235 A1 7/2011 Aman et al.
2011/0173399 A1 7/2011 Chen et al.
2011/0173574 A1 7/2011 Clavin et al.
2011/0175822 A1 7/2011 Poon et al.
2011/0176146 A1 7/2011 Alvarez Diez et al.
2011/0181509 A1 7/2011 Rautiainen et al.
2011/0193778 A1 8/2011 Lee et al.
2011/0193939 A1 8/2011 Vassigh et al.
2011/0205151 A1 8/2011 Newton et al.
2011/0213664 A1 9/2011 Osterhout et al.
2011/0225566 A1 9/2011 Muharsky et al.
2011/0228978 A1 9/2011 Chen et al.
2011/0231797 A1 9/2011 Huhtala et al.
2011/0234631 A1 9/2011 Kim et al.
2011/0234840 A1 9/2011 Klefenz et al.
2011/0243451 A1 10/2011 Oyaizu
2011/0251896 A1 10/2011 Impollonia et al.
2011/0261178 A1 10/2011 Lo et al.
2011/0267259 A1 11/2011 Tidemand et al.
2011/0267265 A1 11/2011 Stinson
2011/0267310 A1 11/2011 Tsukahara et al.
2011/0267344 A1 11/2011 Germann et al.
2011/0279397 A1 11/2011 Rimon et al.
2011/0286676 A1 11/2011 El Dokor
2011/0289455 A1 11/2011 Reville et al.
2011/0289456 A1 11/2011 Reville et al.
2011/0291925 A1 12/2011 Israel et al.
2011/0291988 A1 12/2011 Bamji et al.
2011/0296353 A1 12/2011 Ahmed et al.
2011/0296384 A1 12/2011 Pasternak
2011/0299737 A1 12/2011 Wang et al.
2011/0304600 A1 12/2011 Yoshida
2011/0304650 A1 12/2011 Campillo et al.
2011/0306420 A1 12/2011 Nishimoto et al.
2011/0310007 A1 12/2011 Margolis et al.
2011/0310220 A1 12/2011 McEldowney
2011/0314427 A1 12/2011 Sundararajan
2011/0316679 A1 12/2011 Pihlaja
2011/0317871 A1 12/2011 Tossell et al.
2012/0001938 A1 1/2012 Sandberg
2012/0030637 A1 2/2012 Dey et al.
2012/0038637 A1 2/2012 Marks
2012/0042246 A1 2/2012 Schwesinger et al.
2012/0050157 A1 3/2012 Latta et al.
2012/0053015 A1 3/2012 Esaki et al.
2012/0062489 A1 3/2012 Andersson et al.
2012/0062558 A1 3/2012 Lee et al.
2012/0062736 A1 3/2012 Xiong
2012/0065499 A1 3/2012 Chono
2012/0068914 A1 3/2012 Jacobsen et al.
2012/0079421 A1 3/2012 Arriola
2012/0092254 A1 4/2012 Wong et al.
2012/0098744 A1 4/2012 Stinson, III
2012/0105613 A1 5/2012 Weng et al.
2012/0113223 A1 5/2012 Hilliges et al.
2012/0113255 A1 5/2012 Kasuya et al.
2012/0113316 A1 5/2012 Ueta et al.
2012/0127070 A1 5/2012 Ryoo et al.
2012/0127484 A1 5/2012 Kiyose
2012/0133580 A1 5/2012 Kirby et al.
2012/0150650 A1 6/2012 Zahand
2012/0151421 A1 6/2012 Clarkson
2012/0157203 A1 6/2012 Latta et al.
2012/0159380 A1 6/2012 Kocienda et al.
2012/0163675 A1 6/2012 Joo et al.
2012/0167134 A1 6/2012 Hendricks et al.
2012/0176343 A1 7/2012 Holmgren et al.
2012/0194517 A1 8/2012 Izadi et al.
2012/0204133 A1 8/2012 Guendelman et al.
2012/0214594 A1 8/2012 Kirovski et al.
2012/0218183 A1 8/2012 Givon et al.
2012/0218263 A1 8/2012 Meier et al.
2012/0223959 A1 9/2012 Lengeling
2012/0236287 A1 9/2012 Lee et al.
2012/0236288 A1 9/2012 Stanley
2012/0250936 A1 10/2012 Holmgren
2012/0257797 A1 10/2012 Leyvand et al.
2012/0266109 A1 10/2012 Lim et al.
2012/0268410 A1 10/2012 King et al.
2012/0268642 A1 10/2012 Kawai
2012/0270654 A1 10/2012 Padovani et al.
2012/0274781 A1 11/2012 Shet et al.
2012/0280900 A1 11/2012 Wang et al.
2012/0281873 A1 11/2012 Brown et al.
2012/0281884 A1 11/2012 Whillock et al.
2012/0293642 A1 11/2012 Berini et al.
2012/0293667 A1 11/2012 Baba et al.
2012/0309532 A1 12/2012 Ambrus et al.
2012/0314030 A1 12/2012 Datta et al.
2012/0320080 A1 12/2012 Giese et al.
2012/0320092 A1 12/2012 Shin et al.
2012/0320158 A1 12/2012 Junuzovic et al.
2013/0014052 A1 1/2013 Frey et al.
2013/0019204 A1 1/2013 Kotler et al.
2013/0027300 A1 1/2013 Nakasu et al.
2013/0030573 A1 1/2013 Mercangoez et al.
2013/0033483 A1 2/2013 Im et al.
2013/0038694 A1 2/2013 Nichani et al.
2013/0044951 A1 2/2013 Cherng et al.
2013/0050425 A1 2/2013 Im et al.
2013/0054852 A1 2/2013 Fuoco et al.
2013/0055120 A1 2/2013 Galor et al.
2013/0057469 A1 3/2013 Ajika
2013/0063340 A1 3/2013 Mondragon et al.
2013/0077831 A1 3/2013 Momozono et al.
2013/0080898 A1 3/2013 Lavian et al.
2013/0086531 A1 4/2013 Sugita et al.
2013/0097566 A1 4/2013 Berglund

(56) References Cited

U.S. PATENT DOCUMENTS

2013/0106686 A1 5/2013 Bennett
2013/0108109 A1 5/2013 Leuck et al.
2013/0120319 A1 5/2013 Givon
2013/0135288 A1 5/2013 King et al.
2013/0148852 A1 6/2013 Partis et al.
2013/0152047 A1 6/2013 Moorthi et al.
2013/0167092 A1 6/2013 Yu et al.
2013/0181897 A1 7/2013 Izumi
2013/0182077 A1* 7/2013 Holz ........................ G06F 3/017 348/46
2013/0182079 A1 7/2013 Holz
2013/0182897 A1 7/2013 Holz
2013/0182902 A1* 7/2013 Holz ........................ G06T 7/292 382/103
2013/0185375 A1 7/2013 Aho et al.
2013/0185381 A1 7/2013 Aho et al.
2013/0187952 A1 7/2013 Berkovich et al.
2013/0191911 A1 7/2013 Dellinger et al.
2013/0194173 A1 8/2013 Zhu et al.
2013/0194238 A1 8/2013 Sakai
2013/0207970 A1 8/2013 Shpunt et al.
2013/0208948 A1 8/2013 Berkovich et al.
2013/0215059 A1 8/2013 Lim et al.
2013/0215148 A1 8/2013 Antonyuk et al.
2013/0222233 A1 8/2013 Park et al.
2013/0222640 A1 8/2013 Baek et al.
2013/0225999 A1 8/2013 Banjanin et al.
2013/0229508 A1 9/2013 Li et al.
2013/0239059 A1 9/2013 Chen et al.
2013/0241832 A1 9/2013 Rimon et al.
2013/0252691 A1 9/2013 Alexopoulos
2013/0257736 A1 10/2013 Hou et al.
2013/0258140 A1 10/2013 Lipson et al.
2013/0271397 A1 10/2013 Macdougall et al.
2013/0275907 A1 10/2013 Lau et al.
2013/0278499 A1 10/2013 Anderson
2013/0283213 A1 10/2013 Guendelman et al.
2013/0290911 A1 10/2013 Praphul et al.
2013/0296057 A1 11/2013 Gagner et al.
2013/0300831 A1 11/2013 Mavromatis et al.
2013/0307935 A1 11/2013 Rappel et al.
2013/0318397 A1 11/2013 Jamison
2013/0321265 A1 12/2013 Bychkov et al.
2014/0002365 A1 1/2014 Ackley et al.
2014/0002495 A1 1/2014 Lamb et al.
2014/0008436 A1 1/2014 Boury et al.
2014/0010441 A1 1/2014 Shamaie
2014/0015831 A1 1/2014 Kim et al.
2014/0023247 A1 1/2014 Kuwahara et al.
2014/0028861 A1 1/2014 Holz
2014/0035946 A1 2/2014 Chang et al.
2014/0037135 A1 2/2014 Kutliroff et al.
2014/0043547 A1 2/2014 Marhefka
2014/0055352 A1 2/2014 Davis et al.
2014/0055385 A1 2/2014 Duheille
2014/0055396 A1 2/2014 Aubauer et al.
2014/0063055 A1 3/2014 Osterhout et al.
2014/0063060 A1 3/2014 Maciocci et al.
2014/0064566 A1 3/2014 Shreve et al.
2014/0071069 A1 3/2014 Anderson et al.
2014/0081521 A1 3/2014 Frojdh et al.
2014/0082559 A1 3/2014 Suggs
2014/0085203 A1 3/2014 Kobayashi
2014/0095119 A1 4/2014 Lee et al.
2014/0098018 A1 4/2014 Kim et al.
2014/0111423 A1 4/2014 Park et al.
2014/0113507 A1 4/2014 Vanzetto
2014/0118255 A1 5/2014 Billerbeck
2014/0125775 A1 5/2014 Holz
2014/0125813 A1 5/2014 Holz
2014/0132555 A1 5/2014 Becouarn et al.
2014/0132738 A1 5/2014 Ogura et al.
2014/0134733 A1 5/2014 Wu et al.
2014/0139425 A1 5/2014 Sakai
2014/0139632 A1 5/2014 Livshitz
2014/0139641 A1 5/2014 Holz
2014/0143688 A1 5/2014 Hou et al.
2014/0149754 A1 5/2014 Silva et al.
2014/0157135 A1 6/2014 Lee et al.
2014/0157209 A1 6/2014 Dalal et al.
2014/0160035 A1 6/2014 Sauer et al.
2014/0161311 A1 6/2014 Kim
2014/0168062 A1 6/2014 Katz et al.
2014/0168084 A1 6/2014 Burr
2014/0176310 A1 6/2014 Kotlicki
2014/0176420 A1 6/2014 Zhou et al.
2014/0177913 A1* 6/2014 Holz ........................ G06T 7/37 382/103
2014/0184493 A1 7/2014 Chen
2014/0184496 A1 7/2014 Gribetz et al.
2014/0189579 A1 7/2014 Rimon et al.
2014/0192024 A1 7/2014 Holz
2014/0195988 A1 7/2014 Kramer et al.
2014/0198024 A1 7/2014 Adzhigirey et al.
2014/0201666 A1 7/2014 Bedikian et al.
2014/0201674 A1 7/2014 Holz
2014/0201683 A1 7/2014 Holz
2014/0201684 A1 7/2014 Holz
2014/0201689 A1 7/2014 Bedikian et al.
2014/0201690 A1 7/2014 Holz
2014/0210707 A1 7/2014 Holz
2014/0222385 A1 8/2014 Muenster et al.
2014/0223385 A1 8/2014 Ton et al.
2014/0225826 A1 8/2014 Juni
2014/0225918 A1 8/2014 Mittal et al.
2014/0236529 A1 8/2014 Gyorfi
2014/0240215 A1 8/2014 Tremblay et al.
2014/0240225 A1 8/2014 Eilat
2014/0247695 A1 9/2014 Vangeel et al.
2014/0248950 A1 9/2014 Tosas Bautista
2014/0249961 A1 9/2014 Zagel et al.
2014/0253512 A1 9/2014 Narikawa et al.
2014/0253711 A1 9/2014 Balch et al.
2014/0253785 A1 9/2014 Chan et al.
2014/0258880 A1 9/2014 Holm et al.
2014/0258886 A1 9/2014 Strong
2014/0267098 A1 9/2014 Na et al.
2014/0267666 A1 9/2014 Holz
2014/0282224 A1 9/2014 Pedley
2014/0282274 A1 9/2014 Everitt et al.
2014/0282282 A1 9/2014 Holz
2014/0304665 A1 10/2014 Holz
2014/0306903 A1 10/2014 Huang et al.
2014/0307920 A1 10/2014 Holz
2014/0320274 A1 10/2014 De et al.
2014/0320408 A1 10/2014 Zagorsek et al.
2014/0331185 A1 11/2014 Carls et al.
2014/0340311 A1 11/2014 Holz
2014/0344731 A1 11/2014 Holz
2014/0344762 A1 11/2014 Grasset et al.
2014/0364209 A1 12/2014 Perry
2014/0364212 A1 12/2014 Osman et al.
2014/0369558 A1 12/2014 Holz
2014/0375531 A1 12/2014 Latypov et al.
2014/0375547 A1 12/2014 Katz et al.
2014/0376773 A1 12/2014 Holz
2015/0003673 A1 1/2015 Fletcher
2015/0009149 A1 1/2015 Gharib et al.
2015/0016777 A1 1/2015 Abovitz et al.
2015/0022447 A1 1/2015 Hare et al.
2015/0029091 A1 1/2015 Nakashima et al.
2015/0040040 A1 2/2015 Balan et al.
2015/0054729 A1 2/2015 Minnen et al.
2015/0084864 A1 3/2015 Geiss et al.
2015/0097772 A1 4/2015 Starner
2015/0103004 A1 4/2015 Cohen et al.
2015/0115802 A1 4/2015 Kuti et al.
2015/0116214 A1 4/2015 Grunnet-Jepsen et al.
2015/0131859 A1 5/2015 Kim et al.
2015/0153832 A1 6/2015 Krepec
2015/0153833 A1 6/2015 Pinault et al.
2015/0159992 A1 6/2015 Buckland et al.
2015/0172539 A1 6/2015 Neglur
2015/0193669 A1 7/2015 Gu et al.

(56) References Cited

U.S. PATENT DOCUMENTS

2015/0198716 A1 7/2015 Romano et al.
2015/0205358 A1 7/2015 Lyren
2015/0205400 A1 7/2015 Hwang et al.
2015/0206320 A1 7/2015 Itani et al.
2015/0206321 A1 7/2015 Scavezze et al.
2015/0220149 A1 8/2015 Plagemann et al.
2015/0220150 A1 8/2015 Plagemann et al.
2015/0220776 A1 8/2015 Cronholm
2015/0227795 A1 8/2015 Starner et al.
2015/0234469 A1 8/2015 Akiyoshi
2015/0234569 A1 8/2015 Hess
2015/0253428 A1 9/2015 Holz
2015/0258432 A1 9/2015 Stafford et al.
2015/0261291 A1 9/2015 Mikhailov et al.
2015/0293597 A1 10/2015 Mishra et al.
2015/0301607 A1 10/2015 Saka
2015/0304593 A1 10/2015 Sakai
2015/0309629 A1 10/2015 Amariutei et al.
2015/0317831 A1 11/2015 Ebstyne et al.
2015/0323785 A1 11/2015 Fukata et al.
2015/0331720 A1 11/2015 Huetter et al.
2015/0363001 A1 12/2015 Malzbender
2015/0363070 A1 12/2015 Katz
2016/0012643 A1 1/2016 Kezele et al.
2016/0026255 A1 1/2016 Katz
2016/0062573 A1 3/2016 Dascola et al.
2016/0086046 A1* 3/2016 Holz ...................... G06T 7/254 382/103
2016/0086055 A1* 3/2016 Holz ...................... G06T 7/254 382/103
2016/0093105 A1 3/2016 Rimon et al.
2016/0147376 A1 5/2016 Kim et al.
2016/0270656 A1* 9/2016 Samec ............... G02B 27/0172
2016/0323564 A1 11/2016 Pacheco et al.
2016/0328022 A1 11/2016 Holz
2016/0378294 A1 12/2016 Wright et al.
2017/0061205 A1* 3/2017 Holz ......................... G06T 7/11
2017/0102791 A1 4/2017 Hosenpud et al.
2017/0124928 A1 5/2017 Edwin et al.
2017/0131784 A1 5/2017 Holz
2017/0236293 A1* 8/2017 Holz ......................... G06T 7/37 382/103
2017/0329503 A1 11/2017 Tilton et al.
2018/0276846 A1 9/2018 Mostafavi
2018/0285923 A1 10/2018 Fateh
2019/0012564 A1* 1/2019 Holz ...................... G06T 7/251
2019/0012794 A1 1/2019 Radwin et al.
2019/0019303 A1 1/2019 Siver et al.
2019/0019332 A1 1/2019 Horowitz et al.
2019/0073112 A1 3/2019 Holz
2019/0116322 A1 4/2019 Holzer et al.
2019/0392247 A1* 12/2019 Holz ...................... G06F 3/017
2020/0019766 A1 1/2020 Choi et al.
2020/0053277 A1 2/2020 Shin et al.
2020/0105057 A1 4/2020 Horowitz et al.
2020/0334491 A1* 10/2020 Holz ...................... G06T 7/194
2020/0401232 A1 12/2020 Sills et al.
2021/0302732 A1 9/2021 Lin et al.
2022/0179219 A1 6/2022 Jiang et al.
2022/0198776 A1* 6/2022 Holz ......................... G06T 7/37
2023/0161415 A1 5/2023 Yang et al.
2023/0334636 A1 10/2023 Price et al.
2024/0004479 A1* 1/2024 Holz ...................... G06T 7/344
2024/0085714 A1 3/2024 Kollin et al.
2024/0103441 A1 3/2024 Wang et al.

FOREIGN PATENT DOCUMENTS

CN 1984236 A 6/2007
CN 101124534 A 2/2008
CN 201332447 Y 10/2009
CN 101729808 A 6/2010
CN 101826217 A 9/2010
CN 101930286 A 12/2010
CN 101930610 A 12/2010
CN 101951474 A 1/2011
CN 102053702 A 5/2011
CN 201859393 U 6/2011
CN 102117117 A 7/2011
CN 102135796 A 7/2011
CN 102184014 A 9/2011
CN 102184020 A 9/2011
CN 102201121 A 9/2011
CN 102216883 A 10/2011
CN 102236412 A 11/2011
CN 102262438 A 11/2011
CN 102402290 A 4/2012
CN 102439538 A 5/2012
CN 102696057 A 9/2012
CN 103090862 A 5/2013
CN 105308536 A 2/2016
DE 4201934 A1 7/1993
DE 10326035 A1 1/2005
DE 102007015495 A1 10/2007
DE 102007015497 B4 1/2014
DE 112014000441 T5 10/2015
EP 0999542 A1 5/2000
EP 1477924 A2 11/2004
EP 1837665 A2 9/2007
EP 2369433 A1 9/2011
EP 2369443 A2 9/2011
EP 2378488 A2 10/2011
GB 2419433 A 4/2006
GB 2480140 A 11/2011
GB 2519418 A 4/2015
JP H02236407 A 9/1990
JP H08261721 A 10/1996
JP H09259278 A 10/1997
JP 2000023038 A 1/2000
JP 2002-512069 A 4/2002
JP 2002133400 A 5/2002
JP 2003256814 A 9/2003
JP 2004246252 A 9/2004
JP 2006019526 A 1/2006
JP 2006259829 A 9/2006
JP 2007272596 A 10/2007
JP 2008227569 A 9/2008
JP 2009031939 A 2/2009
JP 2009037594 A 2/2009
JP 2010060548 A 3/2010
JP 2010-523948 A 7/2010
JP 2011-501316 A 1/2011
JP 2011010258 A 1/2011
JP 2011065652 A 3/2011
JP 2011107681 A 6/2011
JP 2011248376 A 12/2011
JP 4906960 B2 3/2012
JP 2012527145 A 11/2012
KR 10-2009-0006825 A 1/2009
KR 101092909 B1 12/2011
RU 2422878 C1 6/2011
SU 1375483 A1 2/1988
TW 200844871 A 11/2008
WO 9426057 A1 11/1994
WO 96/17258 A2 6/1996
WO 97/46975 A1 12/1997
WO 2004114220 A1 12/2004
WO 2006020846 A2 2/2006
WO 2006/090197 A1 8/2006
WO 2007137093 A2 11/2007
WO 2010007662 A1 1/2010
WO 2010032268 A2 3/2010
WO 2010076622 A1 7/2010
WO 2010088035 A2 8/2010
WO 2010/148155 A2 12/2010
WO 2010138741 A1 12/2010
WO 2011024193 A2 3/2011
WO 2011036618 A2 3/2011
WO 2011044680 A1 4/2011
WO 2011045789 A1 4/2011
WO 2011119154 A1 9/2011
WO 2012/039140 A1 3/2012
WO 2012027422 A2 3/2012

(56) References Cited

FOREIGN PATENT DOCUMENTS

| | | | |
|---|---|---|---|
| WO | 2013109608 | A2 | 7/2013 |
| WO | 2013109609 | A2 | 7/2013 |
| WO | 2014/113507 | A1 | 7/2014 |
| WO | 2014/200589 | A2 | 12/2014 |
| WO | 2014208087 | A1 | 12/2014 |
| WO | 2015026707 | A1 | 2/2015 |

OTHER PUBLICATIONS

Examiner Interview Summary Record (PTOL-413) Mailed on Mar. 17, 2026 for U.S. Appl. No. 19/281,507, 2 page(s).
Ko et al., "Gesture Recognition: Enabling Natural Interactions with Electronics", Texas Instruments, https://www.edge-ai-vision.com/2012/04/gesture-recognition-enabling-natural-interactions-with-electronics/ (Apr. 13, 2012) (Year: 2012), in 17 pages.
Non-Final Rejection Mailed on Mar. 16, 2026 for U.S. Appl. No. 18/827,544, 23 page(s).
Non-Final Rejection Mailed on Mar. 19, 2026 for U.S. Appl. No. 19/281,507, 17 page(s).
Non-Final Rejection Mailed on Mar. 27, 2026 for U.S. Appl. No. 19/217,930, 15 page(s).
Notice of Allowance and Fees Due (PTOL-85) Mailed on Apr. 10, 2026 for U.S. Appl. No. 19/026,259, 9 page(s).
Notice of Allowance and Fees Due (PTOL-85) Mailed on Mar. 31, 2026 for U.S. Appl. No. 19/031,318, 8 page(s).
Dombeck, D., et al., "Optical Recording of Action Potentials with Second-Harmonic Generation Microscopy," The Journal of Neuroscience, Jan. 28, 2004, vol. 24(4): pp. 999-1003.
Davis et al., "Toward 3-D Gesture Recognition", International Journal of Pattern Recognition and Artificial Intelligence, vol. 13, No. 03, 1999, pp. 381-393.
Butail, S., et al., "Three-Dimensional Reconstruction of the Fast-Start Swimming Kinematics of Densely Schooling Fish," Journal of the Royal Society Interface, Jun. 3, 2011, retrieved from the Internet <http://www.ncbi.nlm.nih.gov/pubmed/21642367>, pp. 0, 1-12.
Kim, et al., "Development of an Orthogonal Double-Image Processing Algorithm to Measure Bubble," Department of Nuclear Engineering and Technology, Seoul National University Korea, vol. 39 No. 4, Published Jul. 6, 2007, pp. 313-326.
Barat et al., "Feature Correspondences From Multiple Views of Coplanar Ellipses", 2nd International Symposium on Visual Computing, Author Manuscript, 2006, 10 pages.
Cheikh et al., "Multipeople Tracking Across Multiple Cameras", International Journal on New Computer Architectures and Their Applications (IJNCAA), vol. 2, No. 1, 2012, pp. 23-33.
Kulesza, et al., "Arrangement of a Multi Stereo Visual Sensor System for a Human Activities Space," Source: Stereo Vision, Book edited by: Dr. Asim Bhatti, ISBN 978-953-7619-22-0, Copyright Nov. 2008, I-Tech, Vienna, Austria, www.intechopen.com, pp. 153-173.
Heikkila, J., "Accurate Camera Calibration and Feature Based 3-D Reconstruction from Monocular Image Sequences", Infotech Oulu and Department of Electrical Engineering, University of Oulu, 1997, 126 pages.
Olsson, K., et al., "Shape from Silhouette Scanner—Creating a Digital 3D Model of a Real Object by Analyzing Photos From Multiple Views," University of Linkoping, Sweden, Copyright VCG 2001, Retrieved from the Internet: <http://liu.diva-portal.org/smash/get/diva2:18671/FULLTEXT01> on Jun. 17, 2013, 52 pages.
Forbes, K., et al., "Using Silhouette Consistency Constraints to Build 3D Models," University of Cape Town, Copyright De Beers 2003, Retrieved from the internet: <http://www.dip.ee.uct.ac.za/"kforbes/Publications/Forbes2003Prasa.pdf> on Jun. 17, 2013, 6 pages.
May, S., et al., "Robust 3D-Mapping with Time-of-Flight Cameras," 2009 IEEE/RSJ International Conference on Intelligent Robots and Systems, Piscataway, NJ, USA, Oct. 10, 2009, pp. 1673-1678.
Kanhangad, V., et al., "A Unified Framework for Contactless Hand Verification," IEEE Transactions on Information Forensics and Security, IEEE, Piscataway, NJ, US , vol. 6, No. 3, Sep. 1, 2011, pp. 1014-1027.
Di Zenzo, S., et al., "Advances in Image Segmentation," Image and Vision Computing, Elsevier, Guildford, GBN, vol. 1, No. 1, Copyright Butterworth & Co Ltd., Nov. 1, 1983, pp. 196-210.
Arthington, et al., "Cross-section Reconstruction During Uniaxial Loading," Measurement Science and Technology, vol. 20, No. 7, Jun. 10, 2009, Retrieved from the Internet: http:iopscience.iop.org/0957-0233/20/7/075701, pp. 1-9.
Pedersini, et al., Accurate Surface Reconstruction from Apparent Contours, Sep. 5-8, 2000 European Signal Processing Conference EUSIPCO 2000, vol. 4, Retrieved from the Internet: http://home.deib.polimi.it/sarti/CV_and_publications.html, pp. 1-4.
Bardinet, et al., "Fitting of iso-Surfaces Using Superquadrics and Free-Form Deformations" [on-line], Jun. 24-25, 1994 [retrieved Jan. 9, 2014], 1994 Proceedings of IEEE Workshop on Biomedical Image Analysis, Retrieved from the Internet: http://ieeexplore.ieee.org/xpls/abs_all.jsp?arnumber=315882&tag=1, pp. 184-193.
U.S. Appl. No. 13/742,845—Office Action dated Jul. 22, 2013, 21 pages.
U.S. Appl. No. 13/742,845—Notice of Allowance dated Dec. 5, 2013, 11 pages.
U.S. Appl. No. 13/742,953—Office Action dated Jun. 14, 2013, 13 pages.
U.S. Appl. No. 13/742,953—Notice of Allowance dated Nov. 4, 2013, 14 pages.
PCT/US2013/021709—International Preliminary Report on Patentability dated Jul. 22, 2014, 22 pages (WO 2013/109608).
U.S. Appl. No. 13/414,485—Office Action dated May 19, 2014, 16 pages.
U.S. Appl. No. 13/414,485—Final Office Action dated Feb. 12, 2015, 30 pages.
PCT/US2013/021709—International Search Report and Written Opinion dated Sep. 12, 2013, 22 pages.
PCT/US2013/021713—International Search Report and Written Opinion dated Sep. 11, 2013, 7 pages.
U.S. Appl. No. 14/106,148—Office Action dated Jul. 6, 2015, 14 pages.
PCT/US2013/069231—International Search Report and Written Opinion mailed Mar. 13, 2014, 7 pages.
U.S. Appl. No. 13/744,810—Office Action dated Jun. 7, 2013, 15 pages.
U.S. Appl. No. 13/744,810—Final Office Action dated Dec. 16, 2013, 18 pages.
Texas Instruments, "QVGA 3D Time-of-Flight Sensor," Product Overview: OPT 8140, Dec. 2013, Texas Instruments Incorporated, 10 pages.
Texas Instruments, "4-Channel, 12-Bit, 80-MSPS ADC," VSP5324, Revised Nov. 2012, Texas Instruments Incorporated, 55 pages.
Texas Instruments, "Time-of-Flight Controller (TFC)," Product Overview; OPT9220, Jan. 2014, Texas Instruments Incorporated, 43 pages.
PCT/US2013/069231—International Preliminary Report with Written Opinion dated May 12, 2015, 8 pages.
U.S. Appl. No. 14/250,758—Office Action dated Jul. 6, 2015, 8 pages.
U.S. Appl. No. 13/414,485—Office Action dated Jul. 30, 2015, 22 pages.
U.S. Appl. No. 14/106,148—Notice of Allowance dated Dec. 2, 2015, 41 pages.
CN 2013800122765—Office Action dated Nov. 2, 2015, 17 pages.
U.S. Appl. No. 14/959,880—Notice of Allowance dated Mar. 2, 2016, 12 pages.
Matsuyama et al. "Real-Time Dynamic 3-D Object Shape Reconstruction and High-Fidelity Texture Mapping for 3-D Video," IEEE Transactions on Circuits and Systems for Video Technology, vol. 14, No. 3, Mar. 2004, pp. 357-369.
Fukui et al. "Multiple Object Tracking System with Three Level Continuous Processes" IEEE, 1992, pp. 19-27.
U.S. Appl. No. 14/250,758—Final Office Action dated Mar. 10, 2016, 10 pages.

(56) References Cited

OTHER PUBLICATIONS

Mendez, et al., “Importance Masks for Revealing Occluded Objects in Augmented Reality,” Proceedings of the 16th ACM Symposium on Virtual Reality Software and Technology, 2 pages, ACM, 2009.
U.S. Appl. No. 13/414,485—Office Action dated Apr. 21, 2016, 24 pages.
U.S. Appl. No. 14/710,512—Notice of Allowance mailed Apr. 28, 2016, 25 pages.
U.S. Appl. No. 14/959,891—Office Action dated Apr. 11, 2016, 8 pages.
U.S. Appl. No. 14/250,758—Response to Final Office Action dated Mar. 10, 2016 filed May 5, 2016, 12 pages.
U.S. Appl. No. 14/106,148—Response to Office Action dated Jul. 6, 2015 filed Nov. 6, 2015, 41 pages.
U.S. Appl. No. 14/959,880—Notice of Allowance dated Jul. 12, 2016, 8 pages.
U.S. Appl. No. 14/106,148—Notice of Allowance dated Jul. 20, 2016, 30 pages.
U.S. Appl. No. 14/959,891—Notice of Allowance dated Jul. 28, 2016, 19 pages.
Cui et al., “Applications of Evolutionary Computing: Vision-Based Hand Motion Capture Using Genetic Algorithm”, 2004 [retrieved Jul. 15, 2016], Springer Berlin Heidelberg, vol. 3005 of LNCS, pp. 289-300. Retrieved from the Internet: <http://link.springer.com/chapter/10.1007/978-3-540-24653-4_30>.
Delamarre et al., “Finding Pose of Hand in Video Images: A Stereo-based Approach”, Apr. 14-16, 1998 [retrieved Jul. 15, 2016], Third IEEE Intern Conf on Auto Face and Gesture Recog, pp. 585-590. Retrieved from the Internet: <http://ieeexplore.ieee.org/xpl/login.jsp?tp=&arnumber=671011&url=http%3A%2F%2Fieeexplore.ieee.org%2Fxpls%2Fabs_all.jsp%3Farnumber%3D671011>.
De La Gorce et al., “Model-Based 3D Hand Pose Estimation from Monocular Video”, Feb. 24, 2011 [retrieved Jul. 15, 2016], IEEE Transac Pattern Analysis and Machine Intell, vol. 33, Issue: 9, pp. 1793-1805, Retri Internet: <http://ieeexplore. ieee.org/xpl/logi n .jsp ?tp=&arnu mber=571 9617 &u rl=http%3A %2 F%2 Fieeexplore. ieee.org%2Fxpls%2 Fabs all.jsp%3Farnumber%3D5719617>.
Guo et al., Featured Wand for 3D Interaction, Jul. 2-5, 2007 [retrieved Jul. 15, 2016], 2007 IEEE International Conference on Multimedia and Expo, pp. 2230-2233. Retrieved from the Internet: <http://ieeexplore.ieee.org/xpl/login.jsp?tp=&arnumber=4285129&tag=1&url=http%3A%2F%2Fieeexplore.ieee.org%2Fxpls%2Fabs_all.jsp%3Farnumber%3D4285129%26tag%3D1>.
Melax et al., “Dynamics Based 3D Skeletal Hand Tracking”, May 29, 2013 [retrieved Jul. 14, 2016], Proceedings of Graphics Interface, 2013, pp. 63-70. Retrived from the Internet: <http://dl.acm.org/citation.cfm?id=2532141>.
Oka et al., “Real-Time Fingertip Tracking and Gesture Recognition”, Nov./Dec. 2002 [retrieved Jul. 15, 2016], IEEE Computer Graphics and Applications, vol. 22, Issue: 6, pp. 64-71. Retrieved from the Internet: <http://ieeexplore.ieee.org/xpl/login.jsp?tp=&arnumber=1046630&url=http%3A%2F%2Fieeexplore.ieee.org%2Fxpls%2Fabsall.jsp%3Farnumber%3D1046630>.
Schlattmann et al., “Markerless 4 gestures 6 DOF real-time visual tracking of the human hand with automatic initialization”, 2007 [retrieved Jul. 15, 2016], Eurographics 2007, vol. 26, No. 3, 10 pages, Retrieved from the Internet: <http://cg.cs.uni-bonn.de/aigaion2root/attachments/schlattmann-2007-markerless.pdf>.
Wang et al., “Tracking of Deformable Hand in Real Time as Continuous Input for Gesture-based Interaction”, Jan. 28, 2007 [retrieved Jul. 15, 2016], Proceedings of the 12th International Conference on Intelligent User Interfaces, pp. 235-242. Retrieved fromthe Internet: <http://dl.acm.org/citation.cfm?id=1216338>.
Zhao et al., “Combining Marker-Based Mocap and RGB-D Camera for Acquiring High-Fidelity Hand Motion Data”, Jul. 29, 2012 [retrieved Jul. 15, 2016], Proceedings of the ACM SIGGRAPH/Eurographics Symposium on Computer Animation, pp. 33-42, Retrieved from the Internet: <http://dl.acm.org/citation.cfm?id=2422363>.
PCT/US2014/013012—International Search Report and Written Opinion dated May 14, 2014, published as WO 2014116991, 12 pages.
U.S. Appl. No. 14/151,394—Office Action dated Oct. 22, 2015, 26 pgs.
U.S. Appl. No. 14/506,596—Notice of Allowance dated Nov. 9, 2016, 15 pages.
U.S. Appl. No. 14/151,394—Office Action dated Apr. 5, 2016, 26 pages.
U.S. Appl. No. 14/151,394—Office Action dated Sep. 30, 2016, 40 pages.
U.S. Appl. No. 14/214,605—Response to Final Office Action dated Sep. 8, 2016 filed Dec. 7, 2016, 16 pages.
U.S. Appl. No. 14/214,605—Response to Final Office Action dated Jan. 29, 2016 filed Apr. 1, 2016, 17 pages.
U.S. Appl. No. 14/214,605—Response to Non Final Office Action dated Jul. 8, 2015 filed Dec. 1, 2015, 16 pages.
U.S. Appl. No. 14/212,485—Response to Non-Final Office Action dated Jul. 28, 2016 filed Dec. 28, 2016, 16 pages.
U.S. Appl. No. 13/414,485—Office Action dated Nov. 4, 29 pages.
U.S. Appl. No. 15/253,741—Office Action dated Jan. 13, 2014, 53 pages.
U.S. Appl. No. 14/723,370—Office Action dated Jan. 13, 2017, 33 pages.
CN 2013800122765—Notice of Allowance dated Jan. 26, 2017, 2 pages.
JP 2016-104145—First Office Action dated Feb. 21, 2017, 8 pages.
U.S. Appl. No. 14/106, 148—Notice of Allowance dated Dec. 14, 2016, 40 pages.
U.S. Appl. No. 15/349,864—Notice of Allowance mailed Jan. 13, 2017, 12 pages.
U.S. Appl. No. 15/586,048, Office Action mailed Jun. 12, 2017, 68 pages.
U.S. Appl. No. 15/586,048, Response to Office Action mailed Jun. 12, 2017, filed Sep. 6, 2017, 8 pages.
U.S. Appl. No. 15/937,717—Notice of Allowance dated Nov. 21, 2018, 9 pages.
U.S. Appl. No. 15/937,717—Amendment filed Dec. 13, 2018 (after Notice of Allowance), 7 pages.
U.S. Appl. No. 16/525,475—Non-Final Office Action dated Jan. 10, 2020, 77 pages.
CN 201710225106.5—First Office Action dated Oct. 8, 2019, 20 pages.
U.S. Appl. No. 16/525,475—Response to Non-Final Office Action dated Jan. 10, 2020 filed Jan. 30, 20020, 12 pages.
CN 201710225106.5—Response to First Office Action dated Oct. 8, 2019, as filed Feb. 24, 2020, 17 pages.
CN 201710225106.5—Notice of Allowance dated May 8, 2020, 2 pages.
U.S. Appl. No. 16/916,034—Notice of Allowance dated Feb. 2, 2022, 10 pages.
Castle et al., Video-rate Localization in Multiple Maps for Wearable Augmented Reality, IEEE dated Jan. 2008, pp. 1-8.
Krainin et al. Manipulator and Object Tracking for In Hand Model Acquisition, University of Washington, dated Jul. 2011, pp. 1-8.
U.S. Appl. No. 16/525,475—Notice of Allowance, dated Feb. 26, 2020, 14 pages.
Zhang et al., A Wearable Goggle Navigation System for Dual-Mode Optical and Ultrasound Localization of Suspicious Lesions: Validation Studies Using Tissue-Simulating Phantoms and an Ex Vivo Human Breast Tissue Model, PLOS One, dated Jul. 1, 2016, 16 pages.
Palmer, Diffraction Grating Handbook, Newport Corporation, 6th Edition, dated 2005, 54 pages.
JP 2014-552391—First Office Action dated Dec. 9, 2014, 6 pages.
U.S. Appl. No. 13/742,845—Response to Office Action dated Jul. 22, 2013 filed Sep. 26, 2013, 7 pages.
U.S. Appl. No. 14/959,891—Response to Office Action dated Apr. 11, 2016 filed Jun. 8, 2016, 25 pages.
DE 11 2013 000 590.5—First Office Action dated Nov. 5, 2014, 7 pages.
DE 11 2013 000 590.5—Response to First Office Action dated Nov. 5, 2014 filed Apr. 24, 2015, 1 page.

(56) References Cited

OTHER PUBLICATIONS

DE 11 2013 000 590.5—Second Office Action dated Apr. 29, 2015, 7 pages.
DE 11 2013 000 590.5—Response to Second Office Action dated Apr. 29, 2015 filed Sep. 16, 2015, 11 pages.
DE 11 2013 000 590.5—Third Office Action dated Sep. 28, 2015, 4 pages.
DE 11 2013 000 590.5—Response to Third Office Action dated Sep. 28, 2015 filed Dec. 14, 2015, 64 pages.
DE 11 2013 000 590.5—Notice of Allowance dated Jan. 18, 2016, 8 pages.
CN 2013800122765—Response to First Office Action dated Nov. 2, 2015 filed May 14, 2016, 14 pages.
JP 2014-552391—Response to First Office Action dated Dec. 9, 2014 filed Jun. 8, 2015, 9 pages.
JP 2014-552391—Second Office Action dated Jul. 7, 2015, 7 pages.
JP 2014-552391—Response to Second Office Action dated Jul. 7, 2015 filed Dec. 25, 2015, 4 pages.
JP 2014-552391—Third Office Action dated Jan. 26, 2016, 5 pages.
CN 2013800122765—Second Office Action dated Jul. 27, 2016, 6 pages.
U.S. Appl. No. 14/250,758—Office Action dated Sep. 8, 2016, 9 pages.
U.S. Appl. No. 14/710,499—Notice of Allowance dated Sep. 12, 2016, 28 pages.
U.S. Appl. No. 14/710,499—Office Action dated Apr. 14, 2016, 30 pages.
U.S. Appl. No. 14/710,499—Response to Office Action dated Apr. 14, 2016 filed Jul. 14, 2016, 37 pages.
CN 2013800122765—Response to Second Office Action dated Jul. 27, 2016 filed Oct. 11, 2016, 3 pages.
Chung, et al., "Recovering LSHGCs and SHGCs from Stereo," International Journal of Computer Vision, vol. 20, No. 1/2, Oct. 1996, pp. 43-58.
Rasmussen, Matihew K., "An Analytical Framework for the Preparation and Animation of a Virtual Mannequin forthe Purpose of Mannequin-Clothing Interaction Modeling", A Thesis Submitted in Partial Fulfillment of the Requirements for the Master of Science Degree in Civil and Environmental Engineering in the Graduate College of the University of Iowa, Dec. 2008, 98 pages.
VCNL4020 Vishay Semiconductors. Datasheet [online]. Vishay Intertechnology, Inc, Doc No. 83476, Rev. 1.3, Oct. 29, 2013 [retrieved Mar. 4, 2014]. Retrieved from the Internet: <www.vishay.com>. 16 pages.
Schaar, R., VCNL4020 Vishay Semiconductors. Application Note [online]. Extended Detection Range with VCNL Family of Proximity Sensor Vishay Intertechnology, Inc, Doc No. 84225, Revised Oct. 25, 2013 [retrieved Mar. 4, 2014]. Retrieved from the Internet: <www.vishay.com>. 4 pages.
PCT/US2014/028265, International Search Report and Written Opinion, Jan. 7, 2015, 15 pages.
Cumani, A., et al., "Recovering the 3D Structure of Tubular Objects from Stereo Silhouettes," Pattern Recognition, Elsevier, GB, vol. 30, No. 7, Jul. 1, 1997, 9 pages.
PCT/US2013/021709, International Preliminary Report on Patentability and Written Opinion, Sep. 12, 2013, 22 pages (WO 2013/109608).
U.S. Appl. No. 13/742,845, Non-Final Office Action, Jul. 22, 2013, 21 pages (U.S. Pat. No. 8,693,731).
U.S. Appl. No. 13/742,845, Notice of Allowance, Dec. 5, 2013, 7 pages (U.S. Pat. No. 8,693,731).
U.S. Appl. No. 13/742,845, Issue Notification, Mar. 19, 2014, 1 page.
U.S. Appl. No. 13/742,953—Office Action dated Jun. 14, 2013, 13 pages (non HBW).
U.S. Appl. No. 13/742,953—Notice of Allowance dated Nov. 4, 2013, 14 pages (non HBW).
PCT/US2013/021713—International Preliminary Report on Patentability dated Jul. 22, 2014, 13 pages, (WO 2013/109609).
U.S. Appl. No. 13/742,953, Notice of Allowance, Nov. 4, 2013, 9 pages (U.S. Pat. No. 8,638,989).
U.S. Appl. No. 14/214,605, Non Final Office Action dated Jul. 8, 2015, 38 pages.
U.S. Appl. No. 14/214,605, Final Office Action dated Jan. 29, 2016, 11 pages.
U.S. Appl. No. 14/214,605—Office Action dated May 3, 2016, 12 pages.
U.S. Appl. No. 14/212,485—Office Action dated Jul. 28, 2016, 44 pages.
U.S. Appl. No. 14/214,605—Final Office Action dated Sep. 8, 2016, 16 pages.
U.S. Appl. No. 14/214,605—Response to Office Action dated May 3, 2016 filed Aug. 3, 2016, 14 pages.
U.S. Appl. No. 14/154,730—Office Action mailed Nov. 6, 2015, 9 pages.
U.S. Appl. No. 14/155,722—Office Action mailed Nov. 20, 2015, 14 pages.
U.S. Appl. No. 14/281,817—Office Action mailed Sep. 28, 2015, 5 pages.
U.S. Appl. No. 14/262,691—Office Action mailed Dec. 11, 2015, 31 pages.
U.S. Appl. No. 14/154,730—Response to Office Action mailed Nov. 6, 2016, filed Feb. 4, 2016, 9 pages.
U.S. Appl. No. 14/154,730—Notice of Allowance mailed May 3, 2016, 5 pages.
U.S. Appl. No. 14/474,068—Office Action dated Sep. 12, 2016, 23 pages.
U.S. Appl. No. 14/474,077—Office Action dated Jul. 26, 2016, 30 pages.
Ballan et al., "Lecture Notes Computer Science: 12th European Conference on Computer Vision: Motion Capture of Hands in Action Using Discriminative Salient Points", Oct. 7-13, 2012 [retrieved Jul. 14, 2016], Springer Berlin Heidelberg, vol. 7577, pp. 640-653. Retrieved from the Internet: <http://link.springer.com/chapter/10.1007/978-3-642-33783-3 46>.
IPEA/409—International Preliminary Report on Patentability Mailed on Jul. 30, 2015 for WO Application No. PCT/US14/011649, 8 page(s).
IPEA/409—International Preliminary Report on Patentability Mailed on Jul. 30, 2015 for WO Application No. PCT/US14/011737, 15 page(s).
Outgoing—ISA/210—International Search Report Mailed on May 9, 2014 for WO Application No. PCT/US14/011649, 4 page(s).
Outgoing—ISA/210—International Search Report Mailed on May 30, 2014 for WO Application No. PCT/US14/011737, 5 page(s).
Outgoing Written Opinion of the ISA Mailed on May 9, 2014 for WO Application No. PCT/US14/011649, 6 page(s).
Outgoing Written Opinion of the ISA Mailed on May 30, 2014 for WO Application No. PCT/US14/011737, 13 page(s).

* cited by examiner

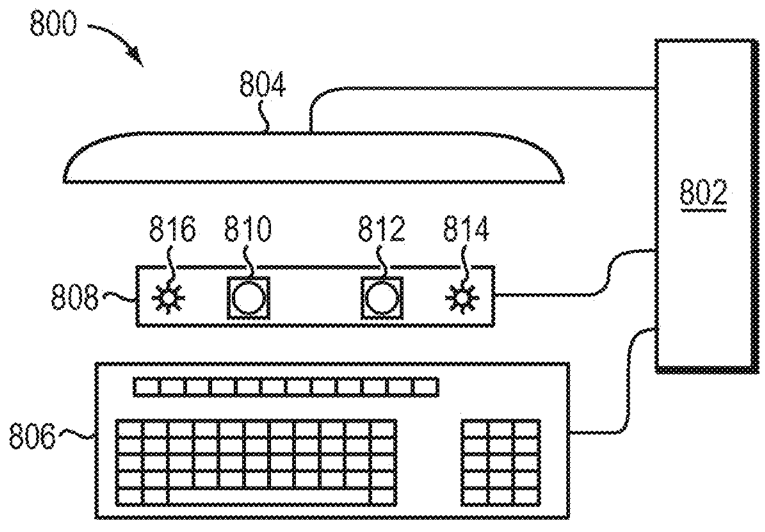
FIG. 8
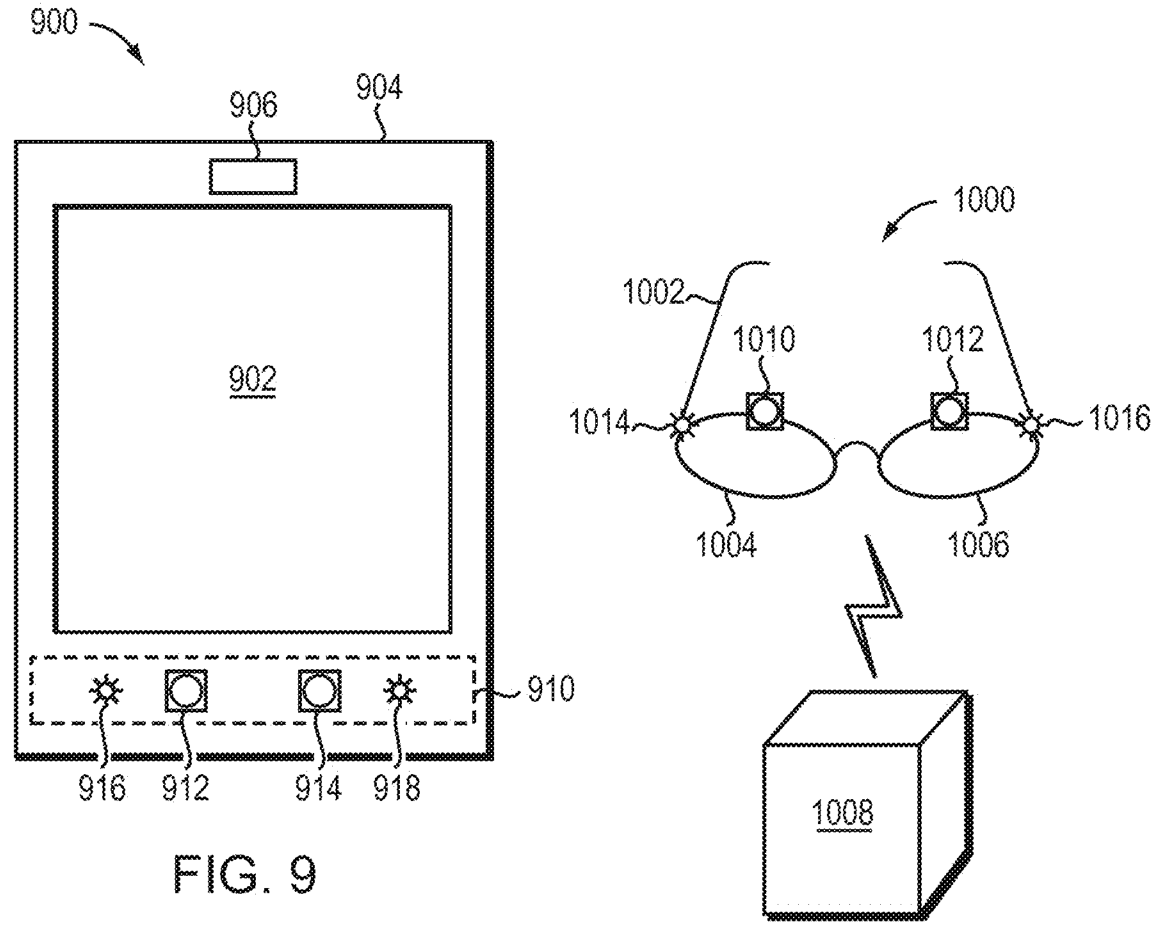
FIG. 9
FIG. 10

DIFFERENTIATING A DETECTED OBJECT FROM A BACKGROUND USING A GAUSSIAN BRIGHTNESS FALLOFF PATTERN

CROSS-REFERENCE TO RELATED APPLICATIONS

This application is a continuation of U.S. application Ser. No. 18/369,768, titled "Differentiating a Detected Object from a Background Using a Gaussian Brightness Falloff Pattern," filed Sep. 18, 2023, which is a continuation of U.S. application Ser. No. 17/693,200, titled "Differentiating a Detected Object from a Background Using a Gaussian Brightness Falloff Pattern," filed Mar. 11, 2022 and issued as U.S. Pat. No. 11,782,516 on Oct. 10, 2023, which is a continuation of U.S. application Ser. No. 16/916,034, titled "Enhanced Contrast for Object Detection and Characterization by Optical Imaging Based on Differences Between Images," filed Jun. 29, 2020 and issued as U.S. Pat. No. 11,308,711 on Apr. 19, 2022, which is a continuation of U.S. application Ser. No. 16/525,475, titled "Enhanced Contrast for Object Detection and Characterization by Optical Imaging Based on Differences Between Images," filed Jul. 29, 2019 and issued as U.S. Pat. No. 10,699,155 on Jun. 30, 2020, which is a continuation of U.S. application Ser. No. 15/937,717, titled "Enhanced Contrast for Object Detection and Characterization by Optical Imaging Based on Differences Between Images," filed Mar. 27, 2018 and issued Jul. 30, 2019 as U.S. Pat. No. 10,366,308 which is a continuation of U.S. patent application Ser. No. 15/586,048, titled "Enhanced Contrast for Object Detection and Characterization by Optical Imaging Based on Differences Between Images," filed May 3, 2017 and issued as U.S. Pat. No. 9,934,580 on Apr. 3, 2018, which is a continuation of Ser. No. 15/349,864, titled "Enhanced Contrast for Object Detection and Characterization by Optical Imaging Based on Differences Between Images," filed Nov. 11, 2016, by David Holz and Hua Yang and issued as U.S. Pat. No. 9,652,668 on May 16, 2017, which is a continuation of U.S. patent application Ser. No. 14/959,891, titled "Enhanced Contrast for Object Detection and Characterization by Optical Imaging Based on Differences Between Images," filed Dec. 4, 2015, by David Holz and Hua Yang and issued as U.S. Pat. No. 9,672,441 on Jun. 6, 2017, which is a continuation of U.S. patent application Ser. No. 14/106,148, titled "Enhanced Contrast for Object Detection and Characterization by Optical Imaging," filed Dec. 13, 2013, by David Holz and Hua Yang and issued as U.S. Pat. No. 9,626,591 on Apr. 18, 2017, which is a continuation of U.S. patent application Ser. No. 13/742,845, titled "Enhanced Contrast for Object Detection and Characterization by Optical Imaging," filed Jan. 16, 2013, by David Holz and Hua Yang, now U.S. Pat. No. 8,693,731, issued Apr. 8, 2014, which is a continuation-in-part of U.S. patent application Ser. No. 13/724,357, titled "Systems and Methods for Capturing Motion In Three-Dimensional Space," filed Dec. 21, 2012, by David Holz, now U.S. Pat. No. 9,070,019, issued Jun. 30, 2015 and is a continuation-in-part of U.S. Ser. No. 13/414,485, titled "Motion Capture Using Cross-Sections of an Object," filed Mar. 7, 2012, by David Holz.

Said U.S. Ser. No. 13/742,845 claims priority to U.S. Provisional Patent Application No. 61/587,554, titled "Methods and Systems for Identifying Position and Shape of Objects In Three-Dimensional Space," filed Jan. 17, 2012, by David Holz, to U.S. Provisional Patent Application No. 61/724,091, titled "Systems and Methods for Capturing Motion In Three-Dimensional Space," filed Nov. 8, 2012, by David Holz and to U.S. Provisional Patent Application No. 61/724,068, titled "Enhanced Contrast for Object Detection and Characterization by Optical Imaging," filed Nov. 8, 2012, by David Holz.

Said U.S. Ser. No. 13/724,357 is a continuation-in-part of U.S. patent application Ser. No. 13/414,485, and also claims priority to U.S. Provisional Patent Application No. 61/724,091, and to U.S. Provisional Patent Application No. 61/587,554.

Said U.S. Ser. No. 13/414,485 claims priority to U.S. Provisional Patent Application No. 61/587,554.

Each of the priority applications are incorporated herein by reference in their entirety.

FIELD OF THE INVENTION

The present disclosure relates generally to imaging systems and in particular to three-dimensional (3D) object detection, tracking and characterization using optical imaging.

BACKGROUND

Motion-capture systems are used in a variety of contexts to obtain information about the conformation and motion of various objects, including objects with articulating members, such as human hands or human bodies. Such systems generally include cameras to capture sequential images of an object in motion and computers to analyze the images to create a reconstruction of an object's volume, position, and motion. For 3D motion capture, at least two cameras are typically used.

Image-based motion-capture systems rely on the ability to distinguish an object of interest from a background. This is often achieved using image-analysis algorithms that detect edges, typically by comparing pixels to detect abrupt changes in color and/or brightness. Such conventional systems, however, suffer performance degradation under many common circumstances, e.g., low contrast between the object of interest and the background and/or patterns in the background that may falsely register as object edges.

In some instances, distinguishing object and background can be facilitated by "instrumenting" the object of interest, e.g., by having a person wear a mesh of reflectors or active light sources or the like while performing the motion. Special lighting conditions (e.g., low light) can be used to make the reflectors or light sources stand out in the images. Instrumenting the subject, however, is not always a convenient or desirable option.

SUMMARY

Certain embodiments of the present invention relate to imaging systems that improve object recognition by enhancing contrast between the object and background surfaces visible in an image using; this may be accomplished, for example, by means of controlled lighting directed at the object. For example, in a motion-capture system where an object of interest, such as a person's hand, is significantly closer to the camera than any background surfaces, the falloff of light intensity with distance (1/r2 for pointlike light sources) can be exploited by positioning a light source (or multiple light sources) near the camera(s) or other image capture device(s) and shining that light onto the object. Source light reflected by the nearby object of interest can be expected to be much brighter than light reflected from more distant background surfaces, and the more distant the background (relative to the object), the more pronounced the effect will be. Accordingly, in some embodiments, a threshold cutoff on pixel brightness in the captured images can be used to distinguish "object" pixels from "background" pixels. While broadband ambient light sources can be employed, various embodiments employ light having a confined wavelength range and a camera matched to detect such light; for example, an infrared source light can be used with one or more cameras sensitive to infrared frequencies.

Accordingly, in a first aspect, the invention pertains to an image capture and analysis system for identifying objects of interest in a digitally represented image scene. In various embodiments, the system comprises at least one camera oriented toward a field of view; at least one light source disposed on a same side of the field of view as the camera and oriented to illuminate the field of view; and an image analyzer coupled to the camera and the light source(s). The image analyzer may be configured to operate the camera(s) to capture a sequence of images including a first image captured at a time when the light source(s) are illuminating the field of view; identify pixels corresponding to the object rather than to the background (e.g., image components that are nearby or reflective); and based on the identified pixels, constructing a 3D model of the object, including a position and shape of the object, to geometrically determine whether it corresponds to the object of interest. In certain embodiments, the image analyzer distinguishes between (i) foreground image components corresponding to objects located within a proximal zone of the field of view, where the proximal zone extends from the camera(s) and has a depth relative thereto of at least twice the expected maximum distance between the objects corresponding to the foreground image components and the camera(s), and (ii) background image components corresponding to objects located within a distal zone of the field of view, where the distal zone is located, relative to the at least one camera, beyond the proximal zone. For example, the proximal zone may have a depth of at least four times the expected maximum distance.

In other embodiments, the image analyzer operates the camera(s) to capture second and third images when the light source(s) are not illuminating the field of view and identifies the pixels corresponding to the object based on the difference between the first and second images and the difference between the first and third images, where the second image is captured before the first image and the third image is captured after the second image.

The light source(s) may, for example, be diffuse emitters—e.g., infrared light-emitting diodes, in which case the camera(s) are an infrared-sensitive camera. Two or more light sources may be arranged to flank the camera(s) and be substantially coplanar therewith. In various embodiments, the camera(s) and the light source(s) are oriented vertically upward. To enhance contrast, the camera may be operated to provide an exposure time no greater than 100 microseconds and the light source(s) may be activated during exposure time at a power level of at least 5 watts. In certain implementations, a holographic diffraction grating is positioned between the lens of each camera and the field of view (i.e., in front of the camera lens).

The image analyzer may geometrically determine whether an object corresponds to the object of interest by identifying ellipses that volumetrically define a candidate object, discarding object segments geometrically inconsistent with an ellipse-based definition, and determining, based on the ellipses, whether the candidate object corresponds to the object of interest.

In another aspect, the invention pertains to a method for capturing and analyzing images. In various embodiments, the method comprises the steps of activating at least one light source to illuminate a field of view containing an object of interest; capturing a sequence of digital images of the field of view using a camera (or cameras) at a time when the light source(s) are activated; identifying pixels corresponding to the object rather than to the background; and based on the identified pixels, constructing a 3D model of the object, including a position and shape of the object, to geometrically determine whether it corresponds to the object of interest.

The light source(s) may be positioned such that objects of interest are located within a proximal zone of the field of view, where the proximal zone extends from the camera to a distance at least twice an expected maximum distance between the objects of interest and the camera. For example, the proximal zone may have a depth of at least four times the expected maximum distance. The light source(s) may, for example, be diffuse emitters—e.g., infrared light-emitting diodes, in which case the camera is an infrared-sensitive camera. Two or more light sources may be arranged to flank the camera and be substantially coplanar therewith. In various embodiments, the camera and the light source(s) are oriented vertically upward. To enhance contrast, the camera may be operated to provide an exposure time no greater than 100 microseconds and the light source(s) may be activated during exposure time at a power level of at least 5 watts.

Alternatively, object pixels may be identified by capturing a first image when the light source(s) are not activated, a second image when the light source(s) are activated, and a third image when the light source(s) are not activated, where pixels corresponding to the object are identified based on a difference between the second and first images and a difference between the second and third images.

Geometrically determining whether an object corresponds to the object of interest may comprise or consist of identifying ellipses that volumetrically define a candidate object, discarding object segments geometrically inconsistent with an ellipse-based definition, and determining, based on the ellipses, whether the candidate object corresponds to the object of interest.

In still another aspect the invention pertains to a method of locating rounded objects within a digital image. In various embodiments, the method comprises the steps of: activating at least one light source to illuminate a field of view containing an object of interest; operating a camera to capture a sequence of images including a first image captured at a time when the at least one light source is illuminating the field of view; and analyzing the images to detect therein Gaussian brightness falloff patterns indicative of rounded objects in the field of view. In some embodiments, the rounded objects are detected without identifying edges thereof. The method may further comprise tracking the motion of the detected rounded objects through a plurality of the captured images.

Another aspect of the invention relates to an image capture and analysis system for locating rounded objects within a field of view. In various embodiments, the system comprises at least one camera oriented toward the field of view; at least one light source disposed on a same side of the field of view as the camera and oriented to illuminate the field of view; and an image analyzer coupled to the camera and the light source. The image analyzer may be configured to operate the camera(s) to capture a sequence of images including a first image captured at a time when the light source(s) are illuminating the field of view; and analyze the images to detect therein Gaussian brightness falloff patterns indicative of rounded objects in the field of view. The rounded objects may, in some embodiments, be detected without identifying edges thereof. The system may track the motion of the detected rounded objects through a plurality of the captured images.

As used herein, the term "substantially" or "approximately" means±10% (e.g., by weight or by volume), and in some embodiments, +5%. The term "consists essentially of" means excluding other materials that contribute to function, unless otherwise defined herein. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

The following detailed description together with the accompanying drawings will provide a better understanding of the nature and advantages of the present invention.

BRIEF DESCRIPTION OF THE DRAWINGS

FIG. 8 is a top view of a computer system incorporating a motion detector as a user input device according to an embodiment of the present invention.

FIG. 9 is a front view of a tablet computer illustrating another example of a computer system incorporating a motion detector according to an embodiment of the present invention.

FIG. 10 illustrates a goggle system incorporating a motion detector according to an embodiment of the present invention.

DETAILED DESCRIPTION

Figure 1:
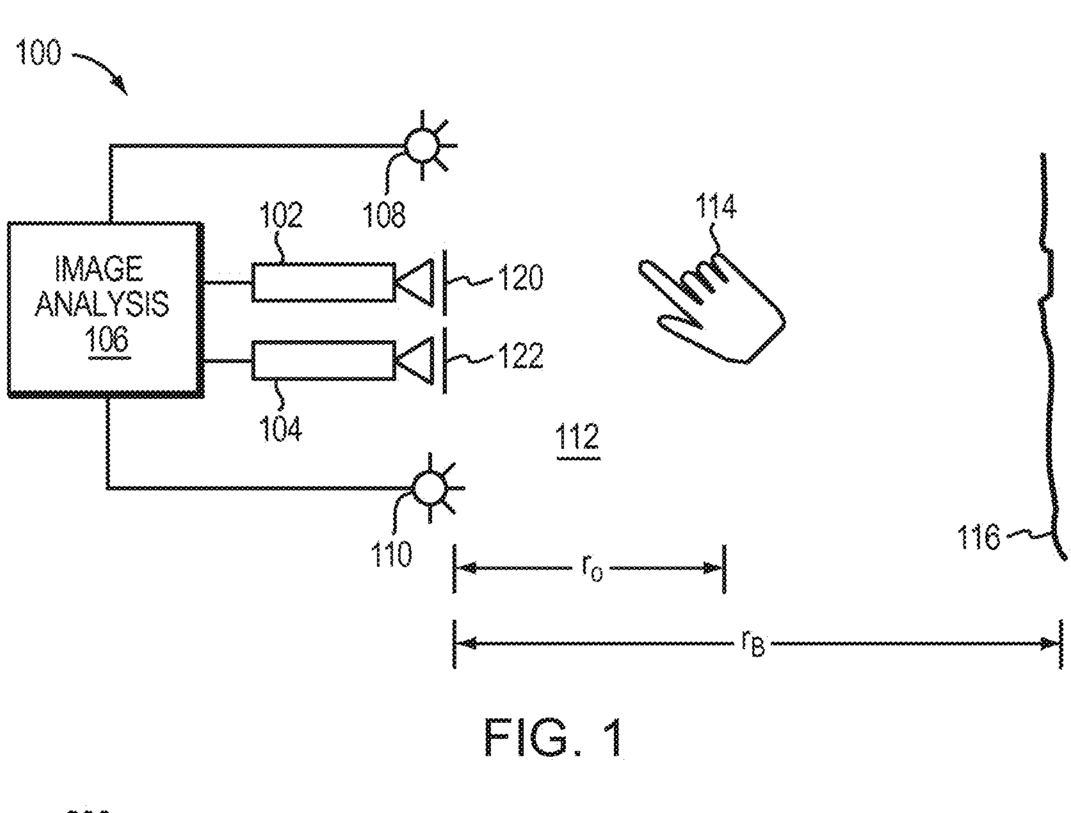
FIG. 1 illustrates a system for capturing image data according to an embodiment of the present invention.

Refer first to FIG. 1, which illustrates a system 100 for capturing image data according to an embodiment of the present invention. System 100 includes a pair of cameras 102, 104 coupled to an image-analysis system 106. Cameras 102, 104 can be any type of camera, including cameras sensitive across the visible spectrum or, more typically, with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths).

The heart of a digital camera is an image sensor, which contains a grid of light-sensitive picture elements (pixels). A lens focuses light onto the surface of the image sensor, and the image is formed as the light strikes the pixels with varying intensity. Each pixel converts the light into an electric charge whose magnitude reflects the intensity of the detected light, and collects that charge so it can be measured. Both CCD and CMOS image sensors perform this same function but differ in how the signal is measured and transferred.

In a CCD, the charge from each pixel is transported to a single structure that converts the charge into a measurable voltage. This is done by sequentially shifting the charge in each pixel to its neighbor, row by row and then column by column in "bucket brigade" fashion, until it reaches the measurement structure. A CMOS sensor, by contrast, places a measurement structure at each pixel location. The measurements are transferred directly from each location to the output of the sensor.

Cameras 102, 104 are preferably capable of capturing video images (i.e., successive image frames at a constant rate of at least 15 frames per second), although no particular frame rate is required. The capabilities of cameras 102, 104 are not critical to the invention, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be defined as a cube approximately one meter on a side.

System 100 also includes a pair of light sources 108, 110, which can be disposed to either side of cameras 102, 104, and controlled by image-analysis system 106. Light sources 108, 110 can be infrared light sources of generally conventional design, e.g., infrared light-emitting diodes (LEDs), and cameras 102, 104 can be sensitive to infrared light. Filters 120, 122 can be placed in front of cameras 102, 104 to filter out visible light so that only infrared light is registered in the images captured by cameras 102, 104. In some embodiments where the object of interest is a person's hand or body, use of infrared light can allow the motion-capture system to operate under a broad range of lighting conditions and can avoid various inconveniences or distractions that may be associated with directing visible light into the region where the person is moving. However, a particular wavelength or region of the electromagnetic spectrum is required.

It should be stressed that the foregoing arrangement is representative and not limiting. For example, lasers or other light sources can be used instead of LEDs. For laser setups, additional optics (e.g., a lens or diffuser) may be employed to widen the laser beam (and make its field of view similar to that of the cameras). Useful arrangements can also include short- and wide-angle illuminators for different ranges. Light sources are typically diffuse rather than specular point sources; for example, packaged LEDs with light-spreading encapsulation are suitable.

In operation, cameras 102, 104 are oriented toward a region of interest 112 in which an object of interest 114 (in this example, a hand) and one or more background objects 116 can be present. Light sources 108, 110 are arranged to illuminate region 112. In some embodiments, one or more of the light sources 108, 110 and one or more of the cameras 102, 104 are disposed below the motion to be detected, e.g., where hand motion is to be detected, beneath the spatial region where that motion takes place. This is an optimal location because the amount of information recorded about the hand is proportional to the number of pixels it occupies in the camera images, the hand will occupy more pixels when the camera's angle with respect to the hand's "pointing direction" is as close to perpendicular as possible. Because it is uncomfortable for a user to orient his palm toward a screen, the optimal positions are either from the bottom looking up, from the top looking down (which requires a bridge) or from the screen bezel looking diagonally up or diagonally down. In scenarios looking up there is less likelihood of confusion with background objects (clutter on the user's desk, for example) and if it is directly looking up then there is little likelihood of confusion with other people out of the field of view (and also privacy is enhanced by not imaging faces). Image-analysis system 106, which can be, e.g., a computer system, can control the operation of light sources 108, 110 and cameras 102, 104 to capture images of region 112. Based on the captured images, image-analysis system 106 determines the position and/or motion of object 114.

For example, as a step in determining the position of object 114, image-analysis system 106 can determine which pixels of various images captured by cameras 102, 104 contain portions of object 114. In some embodiments, any pixel in an image can be classified as an "object" pixel or a "background" pixel depending on whether that pixel contains a portion of object 114 or not. With the use of light sources 108, 110, classification of pixels as object or background pixels can be based on the brightness of the pixel. For example, the distance ($r_O$) between an object of interest 114 and cameras 102, 104 is expected to be smaller than the distance ($r_B$) between background object(s) 116 and cameras 102, 104. Because the intensity of light from sources 108, 110 decreases as $1/r^2$, object 114 will be more brightly lit than background 116, and pixels containing portions of object 114 (i.e., object pixels) will be correspondingly brighter than pixels containing portions of background 116 (i.e., background pixels). For example, if $r_B/r_O=2$, then object pixels will be approximately four times brighter than background pixels, assuming object 114 and background 116 are similarly reflective of the light from sources 108, 110, and further assuming that the overall illumination of region 112 (at least within the frequency band captured by cameras 102, 104) is dominated by light sources 108, 110. These assumptions generally hold for suitable choices of cameras 102, 104, light sources 108, 110, filters 120, 122, and objects commonly encountered. For example, light sources 108, 110 can be infrared LEDs capable of strongly emitting radiation in a narrow frequency band, and filters 120, 122 can be matched to the frequency band of light sources 108, 110. Thus, although a human hand or body, or a heat source or other object in the background, may emit some infrared radiation, the response of cameras 102, 104 can still be dominated by light originating from sources 108, 110 and reflected by object 114 and/or background 116.

In this arrangement, image-analysis system 106 can quickly and accurately distinguish object pixels from background pixels by applying a brightness threshold to each pixel. For example, pixel brightness in a CMOS sensor or similar device can be measured on a scale from 0.0 (dark) to 1.0 (fully saturated), with some number of gradations in between depending on the sensor design. The brightness encoded by the camera pixels scales standardly (linearly) with the luminance of the object, typically due to the deposited charge or diode voltages. In some embodiments, light sources 108, 110 are bright enough that reflected light from an object at distance $r_O$ produces a brightness level of 1.0 while an object at distance $r_B=2r_O$ produces a brightness level of 0.25. Object pixels can thus be readily distinguished from background pixels based on brightness. Further, edges of the object can also be readily detected based on differences in brightness between adjacent pixels, allowing the position of the object within each image to be determined. Correlating object positions between images from cameras 102, 104 allows image-analysis system 106 to determine the location in 3D space of object 114, and analyzing sequences of images allows image-analysis system 106 to reconstruct 3D motion of object 114 using conventional motion algorithms.

It will be appreciated that system 100 is illustrative and that variations and modifications are possible. For example, light sources 108, 110 are shown as being disposed to either side of cameras 102, 104. This can facilitate illuminating the edges of object 114 as seen from the perspectives of both cameras; however, a particular arrangement of cameras and lights is not required. (Examples of other arrangements are described below.) As long as the object is significantly closer to the cameras than the background, enhanced contrast as described herein can be achieved.

Figure 2:
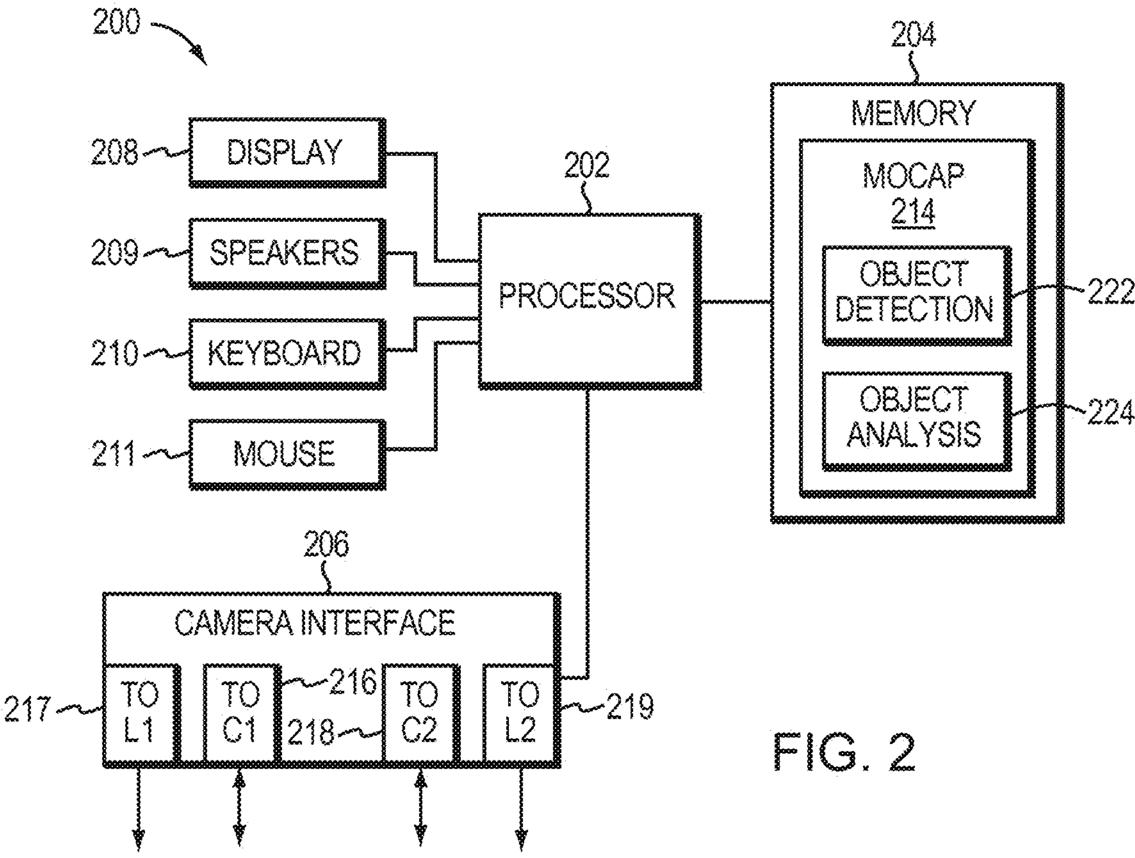
FIG. 2 is a simplified block diagram of a computer system implementing an image analysis apparatus according to an embodiment of the present invention.

Image-analysis system 106 (also referred to as an image analyzer) can include or consist of any device or device component that is capable of capturing and processing image data, e.g., using techniques described herein. FIG. 2 is a simplified block diagram of a computer system 200, implementing image-analysis system 106 according to an embodiment of the present invention. Computer system 200 includes a processor 202, a memory 204, a camera interface 206, a display 208, speakers 209, a keyboard 210, and a mouse 211.

Memory 204 can be used to store instructions to be executed by processor 202 as well as input and/or output data associated with execution of the instructions. In particular, memory 204 contains instructions, conceptually illustrated as a group of modules described in greater detail below, that control the operation of processor 202 and its interaction with the other hardware components. An operating system directs the execution of low-level, basic system functions such as memory allocation, file management and operation of mass storage devices. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Processor 202 may be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the steps of the processes of the invention.

Camera interface 206 can include hardware and/or software that enables communication between computer system 200 and cameras such as cameras 102, 104 shown in FIG. 1, as well as associated light sources such as light sources 108, 110 of FIG. 1. Thus, for example, camera interface 206 can include one or more data ports 216, 218 to which cameras can be connected, as well as hardware and/or software signal processors to modify data signals received from the cameras (e.g., to reduce noise or reformat data) prior to providing the signals as inputs to a conventional motion-capture ("mocap") program 214 executing on processor 202. In some embodiments, camera interface 206 can also transmit signals to the cameras, e.g., to activate or deactivate the cameras, to control camera settings (frame rate, image quality, sensitivity, etc.), or the like. Such signals can be transmitted, e.g., in response to control signals from processor 202, which may in turn be generated in response to user input or other detected events.

Camera interface 206 can also include controllers 217, 219, to which light sources (e.g., light sources 108, 110) can be connected. In some embodiments, controllers 217, 219 supply operating current to the light sources, e.g., in response to instructions from processor 202 executing mocap program 214. In other embodiments, the light sources can draw operating current from an external power supply (not shown), and controllers 217, 219 can generate control signals for the light sources, e.g., instructing the light sources to be turned on or off or changing the brightness. In some embodiments, a single controller can be used to control multiple light sources.

Instructions defining mocap program 214 are stored in memory 204, and these instructions, when executed, perform motion-capture analysis on images supplied from cameras connected to camera interface 206. In one embodiment, mocap program 214 includes various modules, such as an object detection module 222 and an object analysis module 224; again, both of these modules are conventional and well-characterized in the art. Object detection module 222 can analyze images (e.g., images captured via camera interface 206) to detect edges of an object therein and/or other information about the object's location. Object analysis module 224 can analyze the object information provided by object detection module 222 to determine the 3D position and/or motion of the object. Examples of operations that can be implemented in code modules of mocap program 214 are described below. Memory 204 can also include other information and/or code modules used by mocap program 214.

Display 208, speakers 209, keyboard 210, and mouse 211 can be used to facilitate user interaction with computer system 200. These components can be of generally conventional design or modified as desired to provide any type of user interaction. In some embodiments, results of motion capture using camera interface 206 and mocap program 214 can be interpreted as user input. For example, a user can perform hand gestures that are analyzed using mocap program 214, and the results of this analysis can be interpreted as an instruction to some other program executing on processor 200 (e.g., a web browser, word processor, or other application). Thus, by way of illustration, a user might use upward or downward swiping gestures to "scroll" a webpage currently displayed on display 208, to use rotating gestures to increase or decrease the volume of audio output from speakers 209, and so on.

It will be appreciated that computer system 200 is illustrative and that variations and modifications are possible. Computer systems can be implemented in a variety of form factors, including server systems, desktop systems, laptop systems, tablets, smart phones or personal digital assistants, and so on. A particular implementation may include other functionality not described herein, e.g., wired and/or wireless network interfaces, media playing and/or recording capability, etc. In some embodiments, one or more cameras may be built into the computer rather than being supplied as separate components. Further, an image analyzer can be implemented using only a subset of computer system components (e.g., as a processor executing program code, an ASIC, or a fixed-function digital signal processor, with suitable I/O interfaces to receive image data and output analysis results).

While computer system 200 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired.

Figure 3A:
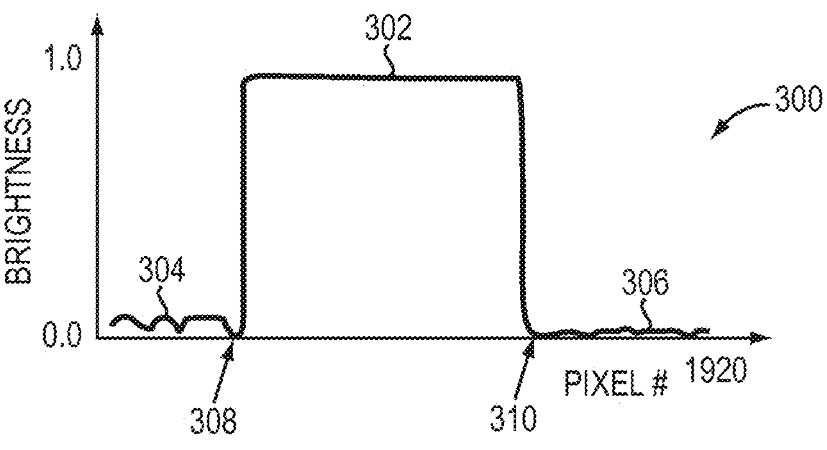
FIGS. 3A, 3B and 3C are graphs of brightness data for rows of pixels that may be obtained according to an embodiment of the present invention.
Figure 3B:
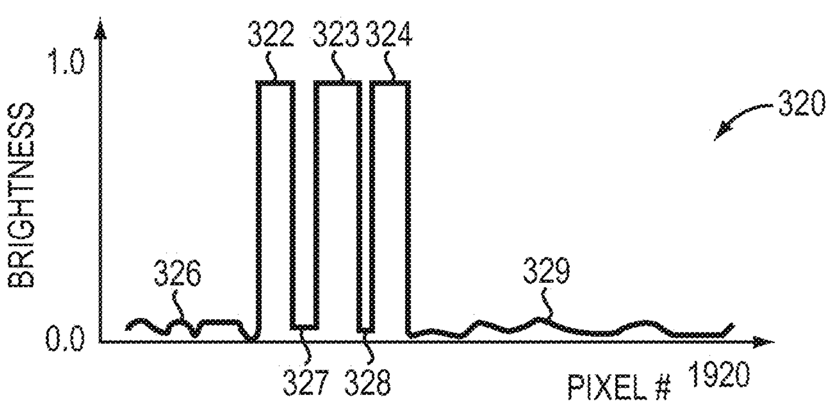
Figure 3C:
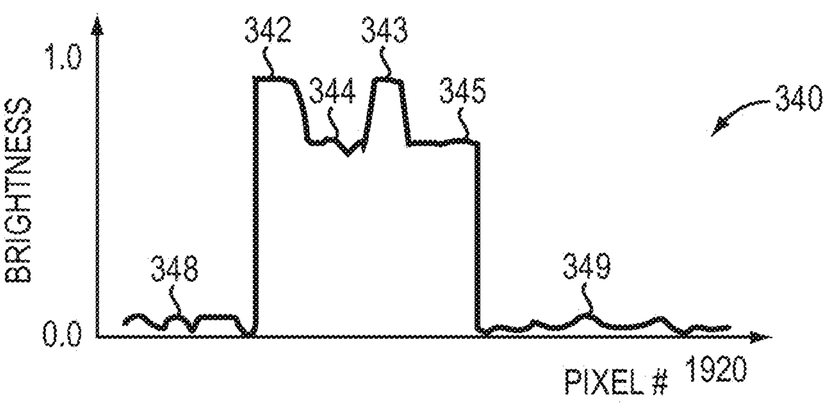

Execution of object detection module 222 by processor 202 can cause processor 202 to operate camera interface 206 to capture images of an object and to distinguish object pixels from background pixels by analyzing the image data. FIGS. 3A-3C are three different graphs of brightness data for rows of pixels that may be obtained according to various embodiments of the present invention. While each graph illustrates one pixel row, it is to be understood that an image typically contains many rows of pixels, and a row can contain any number of pixels; for instance, an HD video image can include 1080 rows having 1920 pixels each.

FIG. 3A illustrates brightness data 300 for a row of pixels in which the object has a single cross-section, such as a cross-section through a palm of a hand. Pixels in region 302, corresponding to the object, have high brightness while pixels in regions 304 and 306, corresponding to background, have considerably lower brightness. As can be seen, the object's location is readily apparent, and the locations of the edges of the object (at 308 at 310) are easily identified. For example, any pixel with brightness above 0.5 can be assumed to be an object pixel, while any pixel with brightness below 0.5 can be assumed to be a background pixel.

FIG. 3B illustrates brightness data 320 for a row of pixels in which the object has multiple distinct cross-sections, such as a cross-section through fingers of an open hand. Regions 322, 323, and 324, corresponding to the object, have high brightness while pixels in regions 326-329, corresponding to background, have low brightness. Again, a simple threshold cutoff on brightness (e.g., at 0.5) suffices to distinguish object pixels from background pixels, and the edges of the object can be readily ascertained.

FIG. 3C illustrates brightness data 340 for a row of pixels in which the distance to the object varies across the row, such as a cross-section of a hand with two fingers extending toward the camera. Regions 342 and 343 correspond to the extended fingers and have highest brightness; regions 344 and 345 correspond to other portions of the hand and are slightly less bright; this can be due in part to being farther away in part to shadows cast by the extended fingers. Regions 348 and 349 are background regions and are considerably darker than hand-containing regions 342-345. A threshold cutoff on brightness (e.g., at 0.5) again suffices to distinguish object pixels from background pixels. Further analysis of the object pixels can also be performed to detect the edges of regions 342 and 343, providing additional information about the object's shape.

It will be appreciated that the data shown in FIGS. 3A-3C is illustrative. In some embodiments, it may be desirable to adjust the intensity of light sources 108, 110 such that an object at an expected distance (e.g., $r_O$ in FIG. 1) will be overexposed—that is, many if not all of the object pixels will be fully saturated to a brightness level of 1.0. (The actual brightness of the object may in fact be higher.) While this may also make the background pixels somewhat brighter, the $1/r^2$ falloff of light intensity with distance still leads to a ready distinction between object and background pixels as long as the intensity is not set so high that background pixels also approach the saturation level. As FIGS. 3A-3C illustrate, use of lighting directed at the object to create strong contrast between object and background allows the use of simple and fast algorithms to distinguish between background pixels and object pixels, which can be particularly useful in real-time motion-capture systems. Simplifying the task of distinguishing background and object pixels can also free up computing resources for other motion-capture tasks (e.g., reconstructing the object's position, shape, and/or motion).

Figure 4:
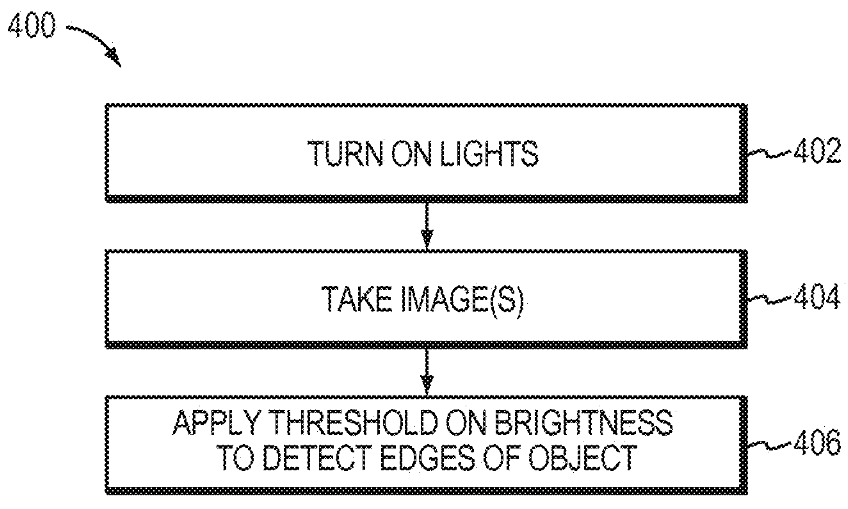
FIG. 4 is a flow diagram of a process for identifying the location of an object in an image according to an embodiment of the present invention.

Refer now to FIG. 4, which illustrates a process 400 for identifying the location of an object in an image according to an embodiment of the present invention. Process 400 can be implemented, e.g., in system 100 of FIG. 1. At block 402, light sources 108, 110 are turned on. At block 404, one or more images are captured using cameras 102, 104. In some embodiments, one image from each camera is captured. In other embodiments, a sequence of images is captured from each camera. The images from the two cameras can be closely correlated in time (e.g., simultaneous to within a few milliseconds) so that correlated images from the two cameras can be used to determine the 3D location of the object.

At block 406, a threshold pixel brightness is applied to distinguish object pixels from background pixels. Block 406 can also include identifying locations of edges of the object based on transition points between background and object pixels. In some embodiments, each pixel is first classified as either object or background based on whether it exceeds the threshold brightness cutoff. For example, as shown in FIGS. 3A-3C, a cutoff at a saturation level of 0.5 can be used. Once the pixels are classified, edges can be detected by finding locations where background pixels are adjacent to object pixels. In some embodiments, to avoid noise artifacts, the regions of background and object pixels on either side of the edge may be required to have a certain minimum size (e.g., 2, 4 or 8 pixels).

In other embodiments, edges can be detected without first classifying pixels as object or background. For example, $\Delta\beta$ can be defined as the difference in brightness between adjacent pixels, and $|\Delta\beta|$ above a threshold (e.g., 0.3 or 0.5 in terms of the saturation scale) can indicate a transition from background to object or from object to background between adjacent pixels. (The sign of $\Delta\beta$ can indicate the direction of the transition.) In some instances where the object's edge is actually in the middle of a pixel, there may be a pixel with an intermediate value at the boundary. This can be detected, e.g., by computing two brightness values for a pixel i: $\beta L=(\beta i+\beta i-1)/2$ and $\beta R=(\beta i+\beta i+1)/2$, where pixel (i−1) is to the left of pixel i and pixel (i+1) is to the right of pixel i. If pixel i is not near an edge, $|\beta L-\beta R|$ will generally be close to zero; if pixel is near an edge, then $|\beta L-\beta R|$ will be closer to 1, and a threshold on $|\beta L-\beta R|$ can be used to detect edges.

In some instances, one part of an object may partially occlude another in an image; for example, in the case of a hand, a finger may partly occlude the palm or another finger. Occlusion edges that occur where one part of the object partially occludes another can also be detected based on smaller but distinct changes in brightness once background pixels have been eliminated. FIG. 3C illustrates an example of such partial occlusion, and the locations of occlusion edges are apparent.

Detected edges can be used for numerous purposes. For example, as previously noted, the edges of the object as viewed by the two cameras can be used to determine an approximate location of the object in 3D space. The position of the object in a 2D plane transverse to the optical axis of the camera can be determined from a single image, and the offset (parallax) between the position of the object in time-correlated images from two different cameras can be used to determine the distance to the object if the spacing between the cameras is known.

Further, the position and shape of the object can be determined based on the locations of its edges in time-correlated images from two different cameras, and motion (including articulation) of the object can be determined from analysis of successive pairs of images. Examples of techniques that can be used to determine an object's position, shape and motion based on locations of edges of the object are described in co-pending U.S. Ser. No. 13/414,485, filed Mar. 7, 2012, the entire disclosure of which is incorporated herein by reference. Those skilled in the art with access to the present disclosure will recognize that other techniques for determining position, shape and motion of an object based on information about the location of edges of the object can also be used.

In accordance with the '485 application, an object's motion and/or position is reconstructed using small amounts of information. For example, an outline of an object's shape, or silhouette, as seen from a particular vantage point can be used to define tangent lines to the object from that vantage point in various planes, referred to herein as "slices." Using as few as two different vantage points, four (or more) tangent lines from the vantage points to the object can be obtained in a given slice. From these four (or more) tangent lines, it is possible to determine the position of the object in the slice and to approximate its cross-section in the slice, e.g., using one or more ellipses or other simple closed curves. As another example, locations of points on an object's surface in a particular slice can be determined directly (e.g., using a time-of-flight camera), and the position and shape of a cross-section of the object in the slice can be approximated by fitting an ellipse or other simple closed curve to the points. Positions and cross-sections determined for different slices can be correlated to construct a 3D model of the object, including its position and shape. A succession of images can be analyzed using the same technique to model motion of the object. Motion of a complex object that has multiple separately articulating members (e.g., a human hand) can be modeled using these techniques.

More particularly, an ellipse in the xy plane can be characterized by five parameters: the x and y coordinates of the center ($x_C$, $y_C$), the semimajor axis, the semiminor axis, and a rotation angle (e.g., angle of the semimajor axis relative to the x axis). With only four tangents, the ellipse is underdetermined. However, an efficient process for estimating the ellipse in spite of this fact involves making an initial working assumption (or "guess") as to one of the parameters and revisiting the assumption as additional information is gathered during the analysis. This additional information can include, for example, physical constraints based on properties of the cameras and/or the object. In some circumstances, more than four tangents to an object may be available for some or all of the slices, e.g., because more than two vantage points are available. An elliptical cross-section can still be determined, and the process in some instances is somewhat simplified as there is no need to assume a parameter value. In some instances, the additional tangents may create additional complexity. In some circumstances, fewer than four tangents to an object may be available for some or all of the slices, e.g., because an edge of the object is out of range of the field of view of one camera or because an edge was not detected. A slice with three tangents can be analyzed. For example, using two parameters from an ellipse fit to an adjacent slice (e.g., a slice that had at least four tangents), the system of equations for the ellipse and three tangents is sufficiently determined that it can be solved. As another option, a circle can be fit to the three tangents; defining a circle in a plane requires only three parameters (the center coordinates and the radius), so three tangents suffice to fit a circle. Slices with fewer than three tangents can be discarded or combined with adjacent slices.

To determine geometrically whether an object corresponds to an object of interest comprises, one approach is to look for continuous volumes of ellipses that define an object and discard object segments geometrically inconsistent with the ellipse-based definition of the object—e.g., segments that are too cylindrical or too straight or too thin or too small or too far away—and discarding these. If a sufficient number of ellipses remain to characterize the object and it conforms to the object of interest, it is so identified, and may be tracked from frame to frame.

Figure 5:
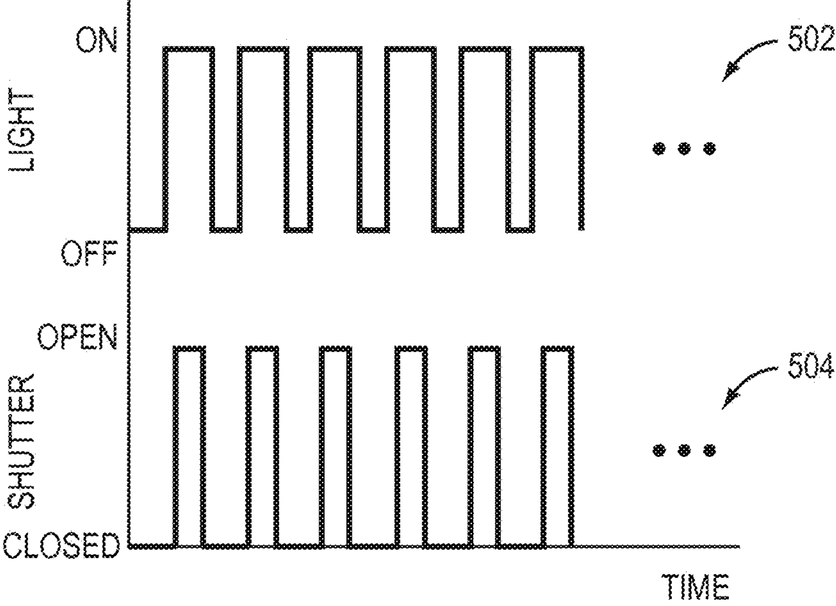
FIG. 5 illustrates a timeline in which light sources pulsed on at regular intervals according to an embodiment of the present invention.

In some embodiments, each of a number of slices is analyzed separately to determine the size and location of an elliptical cross-section of the object in that slice. This provides an initial 3D model (specifically, a stack of elliptical cross-sections), which can be refined by correlating the cross-sections across different slices. For example, it is expected that an object's surface will have continuity, and discontinuous ellipses can accordingly be discounted. Further refinement can be obtained by correlating the 3D model with itself across time, e.g., based on expectations related to continuity in motion and deformation. With renewed reference to FIGS. 1 and 2, in some embodiments, light sources 108, 110 can be operated in a pulsed mode rather than being continually on. This can be useful, e.g., if light sources 108, 110 have the ability to produce brighter light in a pulse than in a steady-state operation. FIG. 5 illustrates a timeline in which light sources 108, 110 are pulsed on at regular intervals as shown at 502. The shutters of cameras 102, 104 can be opened to capture images at times coincident with the light pulses as shown at 504. Thus, an object of interest can be brightly illuminated during the times when images are being captured. In some embodiments, the silhouettes of an object are extracted from one or more images of the object that reveal information about the object as seen from different vantage points. While silhouettes can be obtained using a number of different techniques, in some embodiments, the silhouettes are obtained by using cameras to capture images of the object and analyzing the images to detect object edges.

In some embodiments, the pulsing of light sources 108, 110 can be used to further enhance contrast between an object of interest and background. In particular, the ability to discriminate between relevant and irrelevant (e.g., background) objects in a scene can be compromised if the scene contains object that themselves emit light or are highly reflective. This problem can be addressed by setting the camera exposure time to extraordinarily short periods (e.g., 100 microseconds or less) and pulsing the illumination at very high powers (i.e., 5 to 20 watts or, in some cases, to higher levels, e.g., 40 watts). In this period of time, most common sources of ambient illumination (e.g., fluorescent lights) are very dark by comparison to such bright, short-period illumination; that is, in microseconds, non-pulsed light sources are dimmer than they would appear at an exposure time of milliseconds or more. In effect, this approach increases the contrast of an object of interest with respect to other objects, even those emitting in the same general band. Accordingly, discriminating by brightness under such conditions allows irrelevant objects to be ignored for purposes of image reconstruction and processing. Average power consumption is also reduced; in the case of 20 watts for 100 microseconds, the average power consumption is under 10 milliwatts. In general, the light sources 108, 110 are operated so as to be on during the entire camera exposure period, i.e., the pulse width is equal to the exposure time and is coordinated therewith.

Figure 6:
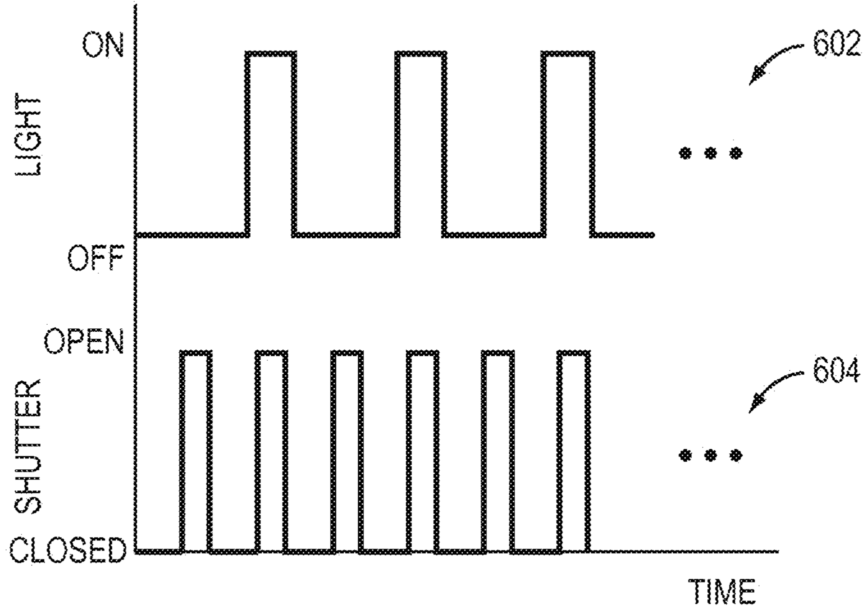
FIG. 6 illustrates a timeline for pulsing light sources and capturing images according to an embodiment of the present invention.

It is also possible to coordinate pulsing of lights 108, 110 for purposes of by comparing images taken with lights 108, 110 on and images taken with lights 108, 110 off. FIG. 6 illustrates a timeline in which light sources 108, 110 are pulsed on at regular intervals as shown at 602, while shutters of cameras 102, 104 are opened to capture images at times shown at 604. In this case, light sources 108, 110 are "on" for every other image. If the object of interest is significantly closer than background regions to light sources 108, 110, the difference in light intensity will be stronger for object pixels than for background pixels. Accordingly, comparing pixels in successive images can help distinguish object and background pixels.

Figure 7:
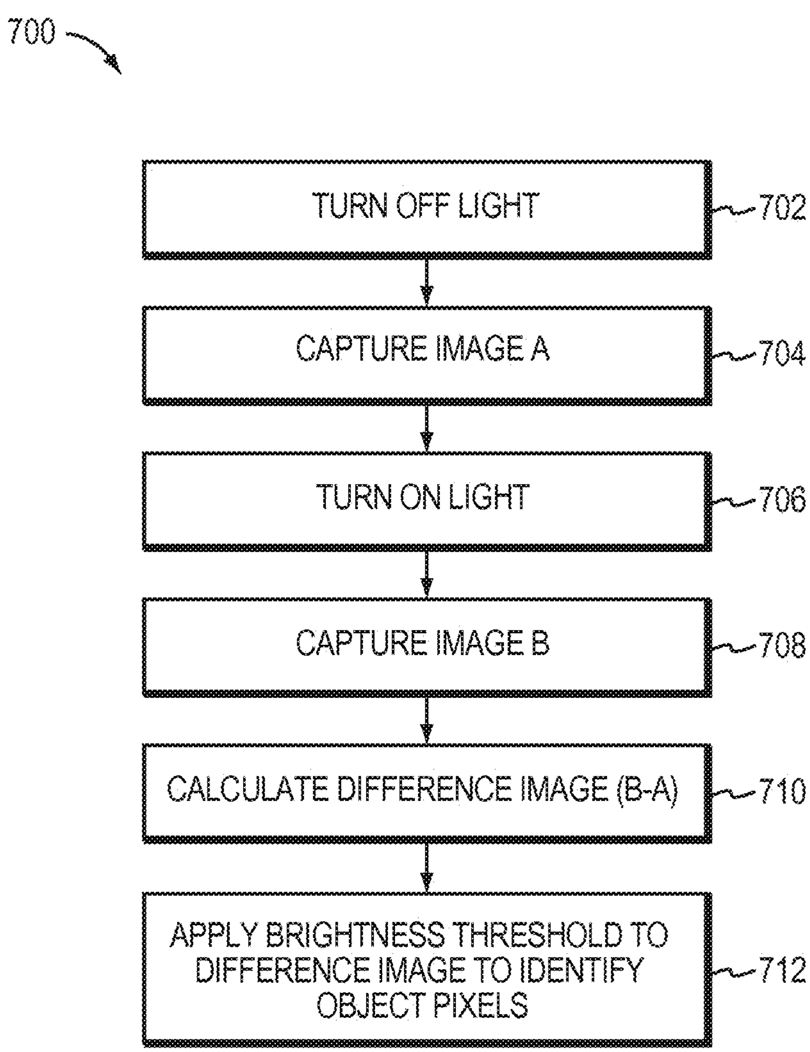
FIG. 7 is a flow diagram of a process for identifying object edges using successive images according to an embodiment of the present invention.

FIG. 7 is a flow diagram of a process 700 for identifying object edges using successive images according to an embodiment of the present invention. At block 702, the light sources are turned off, and at block 704 a first image (A) is captured. Then, at block 706, the light sources are turned on, and at block 708 a second image (B) is captured. At block 710, a "difference" image B−A is calculated, e.g., by subtracting the brightness value of each pixel in image A from the brightness value of the corresponding pixel in image B. Since image B was captured with lights on, it is expected that B−A will be positive for most pixels.

The difference image is used to discriminate between background and foreground by applying a threshold or other metric on a pixel-by-pixel basis. At block 712, a threshold is applied to the difference image (B−A) to identify object pixels, with (B−A) above a threshold being associated with object pixels and (B−A) below the threshold being associated with background pixels. Object edges can then be defined by identifying where object pixels are adjacent to background pixels, as described above. Object edges can be used for purposes such as position and/or motion detection, as described above.

In an alternative embodiment, object edges are identified using a triplet of image frames rather than a pair. For example, in one implementation, a first image (Image1) is obtained with the light sources turned off; a second image (Image2) is obtained with the light sources turned on; and a third image (Image3) is taken with the light sources again turned off. Two difference images, $$\text{Image4} = \text{abs}(\text{Image2} - \text{Image1}) \text{ and}$$

$$\text{Image5} = \text{abs}(\text{Image2} - \text{Image3})$$

are then defined by subtracting pixel brightness values. A final image, Image6, is defined based on the two images Image4 and Image5. In particular, the value of each pixel in Image6 is the smaller of the two corresponding pixel values in Image4 and Image5. In other words, Image6=min (Image4, Image5) on a pixel-by-pixel basis. Image6 represents an enhanced-accuracy difference image and most of its pixels will be positive. Once again, a threshold or other metric can be used on a pixel-by-pixel basis to distinguish foreground and background pixels.

Contrast-based object detection as described herein can be applied in any situation where objects of interest are expected to be significantly closer (e.g., half the distance) to the light source(s) than background objects. One such application relates to the use of motion-detection as user input to interact with a computer system. For example, the user may point to the screen or make other hand gestures, which can be interpreted by the computer system as input.

A computer system 800 incorporating a motion detector as a user input device according to an embodiment of the present invention is illustrated in FIG. 8. Computer system 800 includes a desktop box 802 that can house various components of a computer system such as processors, memory, fixed or removable disk drives, video drivers, audio drivers, network interface components, and so on. A display 804 is connected to desktop box 802 and positioned to be viewable by a user. A keyboard 806 is positioned within easy reach of the user's hands. A motion-detector unit 808 is placed near keyboard 806 (e.g., behind, as shown or to one side), oriented toward a region in which it would be natural for the user to make gestures directed at display 804 (e.g., a region in the air above the keyboard and in front of the monitor). Cameras 810, 812 (which can be similar or identical to cameras 102, 104 described above) are arranged to point generally upward, and light sources 814, 816 (which can be similar or identical to light sources 108, 110 described above) are arranged to either side of cameras 810, 812 to illuminate an area above motion-detector unit 808. In typical implementations, the cameras 810, 812 and the light sources 814, 816 are substantially coplanar. This configuration prevents the appearance of shadows that can, for example, interfere with edge detection (as can be the case were the light sources located between, rather than flanking, the cameras). A filter, not shown, can be placed over the top of motion-detector unit 808 (or just over the apertures of cameras 810, 812) to filter out all light outside a band around the peak frequencies of light sources 814, 816.

In the illustrated configuration, when the user moves a hand or other object (e.g., a pencil) in the field of view of cameras 810, 812, the background will likely consist of a ceiling and/or various ceiling-mounted fixtures. The user's hand can be 10-20 cm above motion detector 808, while the ceiling may be five to ten times that distance (or more). Illumination from light sources 814, 816 will therefore be much more intense on the user's hand than on the ceiling, and the techniques described herein can be used to reliably distinguish object pixels from background pixels in images captured by cameras 810, 812. If infrared light is used, the user will not be distracted or disturbed by the light.

Computer system 800 can utilize the architecture shown in FIG. 1. For example, cameras 810, 812 of motion-detector unit 808 can provide image data to desktop box 802, and image analysis and subsequent interpretation can be performed using the processors and other components housed within desktop box 802. Alternatively, motion-detector unit 808 can incorporate processors or other components to perform some or all stages of image analysis and interpretation. For example, motion-detector unit 808 can include a processor (programmable or fixed-function) that implements one or more of the processes described above to distinguish between object pixels and background pixels. In this case, motion-detector unit 808 can send a reduced representation of the captured images (e.g., a representation with all background pixels zeroed out) to desktop box 802 for further analysis and interpretation. A particular division of computational tasks between a processor inside motion-detector unit 808 and a processor inside desktop box 802 is not required.

It is not always necessary to discriminate between object pixels and background pixels by absolute brightness levels; for example, where knowledge of object shape exists, the pattern of brightness falloff can be utilized to detect the object in an image even without explicit detection of object edges. On rounded objects (such as hands and fingers), for example, the $1/r^2$ relationship produces Gaussian or near-Gaussian brightness distributions near the centers of the objects; imaging a cylinder illuminated by an LED and disposed perpendicularly with respect to a camera results in an image having a bright center line corresponding to the cylinder axis, with brightness falling off to each side (around the cylinder circumference). Fingers are approximately cylindrical, and by identifying these Gaussian peaks, it is possible to locate fingers even in situations where the background is close and the edges are not visible due to the relative brightness of the background (either due to proximity or the fact that it may be actively emitting infrared light). The term "Gaussian" is used broadly herein to connote a curve with a negative second derivative. Often such curves will be bell-shaped and symmetric, but this is not necessarily the case; for example, in situations with higher object specularity or if the object is at an extreme angle, the curve may be skewed in a particular direction. Accordingly, as used herein, the term "Gaussian" is not limited to curves explicitly conforming to a Gaussian function.

FIG. 9 illustrates a tablet computer 900 incorporating a motion detector according to an embodiment of the present invention. Tablet computer 900 has a housing, the front surface of which incorporates a display screen 902 surrounded by a bezel 904. One or more control buttons 906 can be incorporated into bezel 904. Within the housing, e.g., behind display screen 902, tablet computer 900 can have various conventional computer components (processors, memory, network interfaces, etc.). A motion detector 910 can be implemented using cameras 912, 914 (e.g., similar or identical to cameras 102, 104 of FIG. 1) and light sources 916, 918 (e.g., similar or identical to light sources 108, 110 of FIG. 1) mounted into bezel 904 and oriented toward the front surface so as to capture motion of a user positioned in front of tablet computer 900.

When the user moves a hand or other object in the field of view of cameras 912, 914, the motion is detected as described above. In this case, the background is likely to be the user's own body, at a distance of roughly 25-30 cm from tablet computer 900. The user may hold a hand or other object at a short distance from display 902, e.g., 5-10 cm. As long as the user's hand is significantly closer than the user's body (e.g., half the distance) to light sources 916, 918, the illumination-based contrast enhancement techniques described herein can be used to distinguish object pixels from background pixels. The image analysis and subsequent interpretation as input gestures can be done within tablet computer 900 (e.g., leveraging the main processor to execute operating-system or other software to analyze data obtained from cameras 912, 914). The user can thus interact with tablet 900 using gestures in 3D space.

A goggle system 1000, as shown in FIG. 10, may also incorporate a motion detector according to an embodiment of the present invention. Goggle system 1000 can be used, e.g., in connection with virtual-reality and/or augmented-reality environments. Goggle system 1000 includes goggles 1002 that are wearable by a user, similar to conventional eyeglasses. Goggles 1002 include eyepieces 1004, 1006 that can incorporate small display screens to provide images to the user's left and right eyes, e.g., images of a virtual reality environment. These images can be provided by a base unit 1008 (e.g., a computer system) that is in communication with goggles 1002, either via a wired or wireless channel. Cameras 1010, 1012 (e.g., similar or identical to cameras 102, 104 of FIG. 1) can be mounted in a frame section of goggles 1002 such that they do not obscure the user's vision. Light sources 1014, 1016 can be mounted in the frame section of goggles 1002 to either side of cameras 1010, 1012. Images collected by cameras 1010, 1012 can be transmitted to base unit 1008 for analysis and interpretation as gestures indicating user interaction with the virtual or augmented environment. (In some embodiments, the virtual or augmented environment presented through eyepieces 1004, 1006 can include a representation of the user's hand, and that representation can be based on the images collected by cameras 1010, 1012.)

When the user gestures using a hand or other object in the field of view of cameras 1008, 1010, the motion is detected as described above. In this case, the background is likely to be a wall of a room the user is in, and the user will most likely be sitting or standing at some distance from the wall. As long as the user's hand is significantly closer than the user's body (e.g., half the distance) to light sources 1012, 1014, the illumination-based contrast enhancement techniques described herein facilitate distinguishing object pixels from background pixels. The image analysis and subsequent interpretation as input gestures can be done within base unit 1008.

It will be appreciated that the motion-detector implementations shown in FIGS. 8-10 are illustrative and that variations and modifications are possible. For example, a motion detector or components thereof can be combined in a single housing with other user input devices, such as a keyboard or trackpad. As another example, a motion detector can be incorporated into a laptop computer, e.g., with upward-oriented cameras and light sources built into the same surface as the laptop keyboard (e.g., to one side of the keyboard or in front of or behind it) or with front-oriented cameras and light sources built into a bezel surrounding the laptop's display screen. As still another example, a wearable motion detector can be implemented, e.g., as a headband or headset that does not include active displays or optical components.

Figure 11:
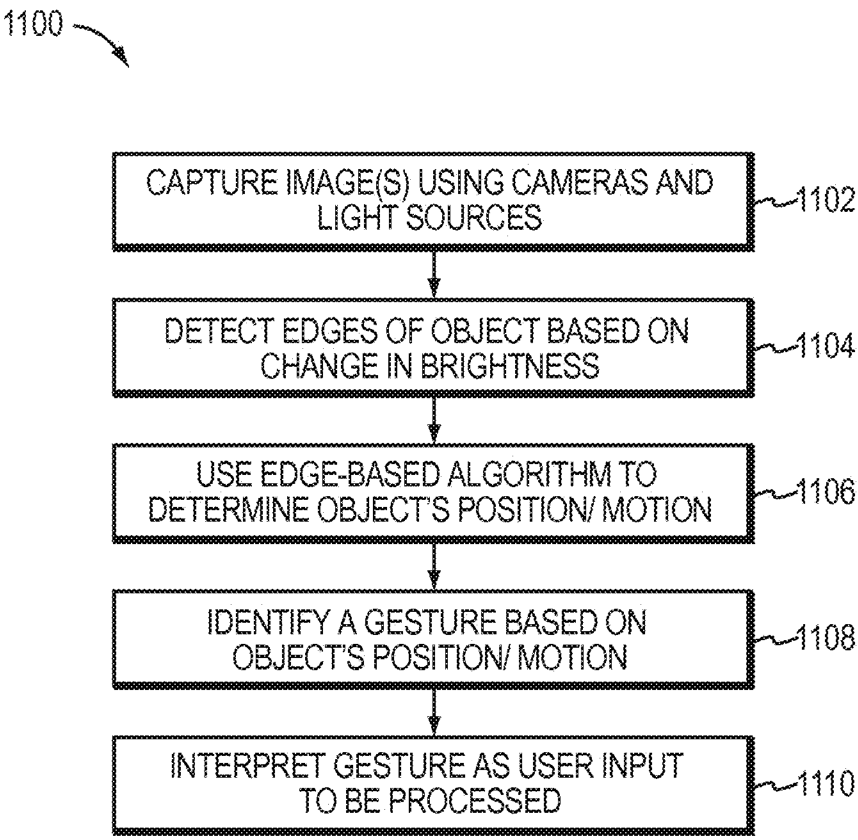
FIG. 11 is a flow diagram of a process for using motion information as user input to control a computer system or other system according to an embodiment of the present invention.

As illustrated in FIG. 11, motion information can be used as user input to control a computer system or other system according to an embodiment of the present invention. Process 1100 can be implemented, e.g., in computer systems such as those shown in FIGS. 8-10. At block 1102, images are captured using the light sources and cameras of the motion detector. As described above, capturing the images can include using the light sources to illuminate the field of view of the cameras such that objects closer to the light sources (and the cameras) are more brightly illuminated than objects farther away.

At block 1104, the captured images are analyzed to detect edges of the object based on changes in brightness. For example, as described above, this analysis can include comparing the brightness of each pixel to a threshold, detecting transitions in brightness from a low level to a high level across adjacent pixels, and/or comparing successive images captured with and without illumination by the light sources. At block 1106, an edge-based algorithm is used to determine the object's position and/or motion. This algorithm can be, for example, any of the tangent-based algorithms described in the above-referenced '485 application; other algorithms can also be used.

At block 1108, a gesture is identified based on the object's position and/or motion. For example, a library of gestures can be defined based on the position and/or motion of a user's fingers. A "tap" can be defined based on a fast motion of an extended finger toward a display screen. A "trace" can be defined as motion of an extended finger in a plane roughly parallel to the display screen. An inward pinch can be defined as two extended fingers moving closer together and an outward pinch can be defined as two extended fingers moving farther apart. Swipe gestures can be defined based on movement of the entire hand in a particular direction (e.g., up, down, left, right) and different swipe gestures can be further defined based on the number of extended fingers (e.g., one, two, all). Other gestures can also be defined. By comparing a detected motion to the library, a particular gesture associated with detected position and/or motion can be determined.

At block 1110, the gesture is interpreted as user input, which the computer system can process. The particular processing generally depends on application programs currently executing on the computer system and how those programs are configured to respond to particular inputs. For example, a tap in a browser program can be interpreted as selecting a link toward which the finger is pointing. A tap in a word-processing program can be interpreted as placing the cursor at a position where the finger is pointing or as selecting a menu item or other graphical control element that may be visible on the screen. The particular gestures and interpretations can be determined at the level of operating systems and/or applications as desired, and no particular interpretation of any gesture is required.

Full-body motion can be captured and used for similar purposes. In such embodiments, the analysis and reconstruction advantageously occurs in approximately real-time (e.g., times comparable to human reaction times), so that the user experiences a natural interaction with the equipment. In other applications, motion capture can be used for digital rendering that is not done in real time, e.g., for computer-animated movies or the like; in such cases, the analysis can take as long as desired.

Embodiments described herein provide efficient discrimination between object and background in captured images by exploiting the decrease of light intensity with distance. By brightly illuminating the object using one or more light sources that are significantly closer to the object than to the background (e.g., by a factor of two or more), the contrast between object and background can be increased. In some instances, filters can be used to remove light from sources other than the intended sources. Using infrared light can reduce unwanted "noise" or bright spots from visible light sources likely to be present in the environment where images are being captured and can also reduce distraction to users (who presumably cannot see infrared).

Figure 12:
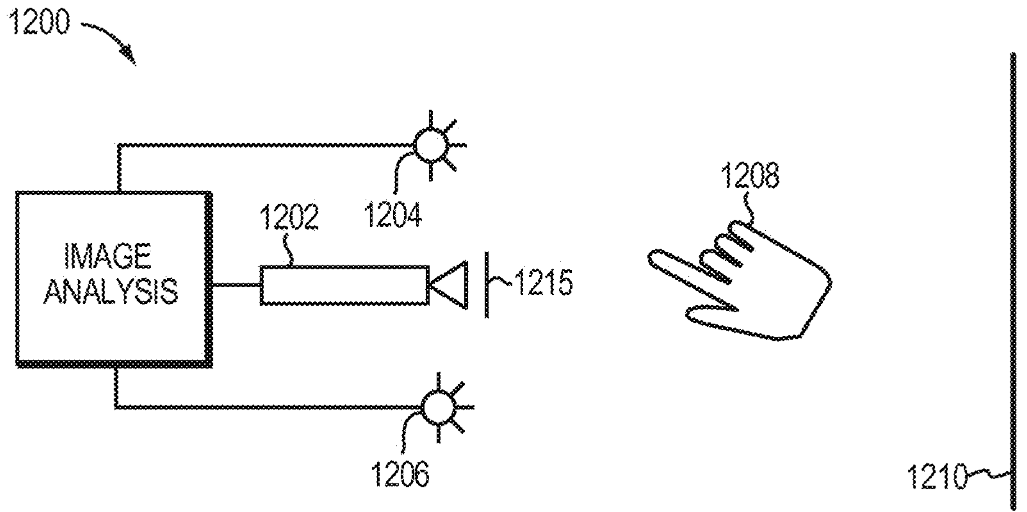
FIG. 12 illustrates a system for capturing image data according to another embodiment of the present invention.

The embodiments described above provide two light sources, one disposed to either side of the cameras used to capture images of the object of interest. This arrangement can be particularly useful where the position and motion analysis relies on knowledge of the object's edges as seen from each camera, as the light sources will illuminate those edges. However, other arrangements can also be used. For example, FIG. 12 illustrates a system 1200 with a single camera 1202 and two light sources 1204, 1206 disposed to either side of camera 1202. This arrangement can be used to capture images of object 1208 and shadows cast by object 1208 against a flat background region 1210. In this embodiment, object pixels and background pixels can be readily distinguished. In addition, provided that background 1210 is not too far from object 1208, there will still be enough contrast between pixels in the shadowed background region and pixels in the unshadowed background region to allow discrimination between the two. Position and motion detection algorithms using images of an object and its shadows are described in the above-referenced '485 application and system 1200 can provide input information to such algorithms, including the location of edges of the object and its shadows.

The single-camera implementation 1200 may benefit from inclusion of a holographic diffraction grating 1215 placed in front of the lens of the camera 1202. The grating 1215 creates fringe patterns that appear as ghost silhouettes and/or tangents of the object 1208. Particularly when separable (i.e., when overlap is not excessive), these patterns provide high contrast facilitating discrimination of object from background. See, e.g., Diffraction Grating Handbook (Newport Corporation, January 2005; available at http://gratings.newport.com/library/handbook/handbook.asp), the entire disclosure of which is hereby incorporated by reference.

Figure 13:
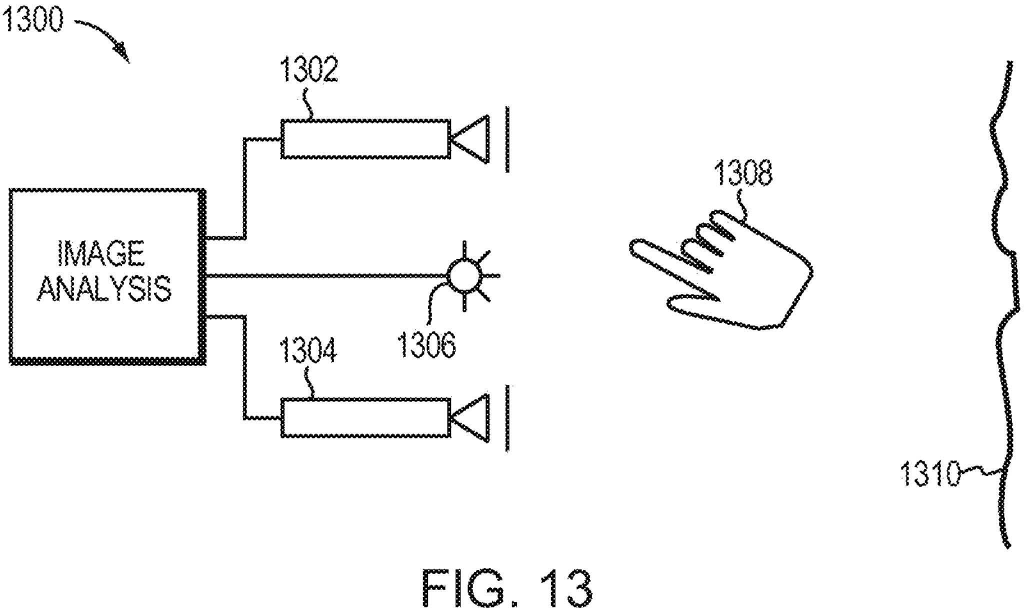
FIG. 13 illustrates a system for capturing image data according to still another embodiment of the present invention.

FIG. 13 illustrates another system 1300 with two cameras 1302, 1304 and one light source 1306 disposed between the cameras. System 1300 can capture images of an object 1308 against a background 1310. System 1300 is generally less reliable for edge illumination than system 100 of FIG. 1; however, not all algorithms for determining position and motion rely on precise knowledge of the edges of an object. Accordingly, system 1300 can be used, e.g., with edge-based algorithms in situations where less accuracy is required. System 1300 can also be used with non-edge-based algorithms.

While the invention has been described with respect to specific embodiments, one skilled in the art will recognize that numerous modifications are possible. The number and arrangement of cameras and light sources can be varied. The cameras' capabilities, including frame rate, spatial resolution, and intensity resolution, can also be varied as desired. The light sources can be operated in continuous or pulsed mode. The systems described herein provide images with enhanced contrast between object and background to facilitate distinguishing between the two, and this information can be used for numerous purposes, of which position and/or motion detection is just one among many possibilities.

Threshold cutoffs and other specific criteria for distinguishing object from background can be adapted for particular cameras and particular environments. As noted above, contrast is expected to increase as the ratio $r_B/r_O$ increases. In some embodiments, the system can be calibrated in a particular environment, e.g., by adjusting light-source brightness, threshold criteria, and so on. The use of simple criteria that can be implemented in fast algorithms can free up processing power in a given system for other uses.

Any type of object can be the subject of motion capture using these techniques, and various aspects of the implementation can be optimized for a particular object. For example, the type and positions of cameras and/or light sources can be optimized based on the size of the object whose motion is to be captured and/or the space in which motion is to be captured. Analysis techniques in accordance with embodiments of the present invention can be implemented as algorithms in any suitable computer language and executed on programmable processors. Alternatively, some or all of the algorithms can be implemented in fixed-function logic circuits, and such circuits can be designed and fabricated using conventional or other tools.

Computer programs incorporating various features of the present invention may be encoded on various computer readable storage media; suitable media include magnetic disk or tape, optical storage media such as compact disk (CD) or DVD (digital versatile disk), flash memory, and any other non-transitory medium capable of holding data in a computer-readable form. Computer-readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

Thus, although the invention has been described with respect to specific embodiments, it will be appreciated that the invention is intended to cover all modifications and equivalents within the scope of the following claims.

We claim as follows:

1. A wearable goggle comprising one or more processors configured to:

obtain an identification of pixels of a plurality of digital images, associated with a holographic diffraction grating, that correspond to at least one finger of a hand that is visible in the plurality of digital images rather than to a background in the plurality of digital images, the pixels being identified by:

obtaining, from the holographic diffraction grating, (i) a fringe pattern comprising an interference distribution of the holographic diffraction grating, wherein the fringe pattern provides a high contrast differential between the at least one finger and the background and (ii) a ghost silhouette; and identifying the pixels that correspond to the at least one finger based on at least one of the fringe pattern and the ghost silhouette; and track motion of the identified pixels that correspond to the at least one finger through the plurality of digital images.

2. The wearable goggle of claim 1, wherein the one or more processors are further configured to:

compare the tracked motion to a library of gestures;

identify a particular gesture from the library of gestures that corresponds to the tracked motion; and enable the particular gesture that corresponds to the tracked motion.

3. The wearable goggle of claim 1, wherein the one or more processors are further configured to:

construct a model of the at least one finger based on the identified pixels that correspond to the at least one finger and the tracked motion of the identified pixels that correspond to the at least one finger, wherein the constructing of the model includes constructing a 3D model of the at least one finger, including a position and a shape of the at least one finger, to geometrically determine whether the at least one finger corresponds to an object of interest, and wherein at least one light source is positioned such that objects of interest are located within a proximal zone of a field of view of a camera responsible for the plurality of digital images, the proximal zone extending from the camera to a distance less than twice an expected maximum distance between the objects of interest and the camera.

4. The wearable goggle of claim 1, wherein the holographic diffraction grating is one of a classical grating, a first generation holographic grating, or a Sheridon grating.

5. The wearable goggle of claim 1, wherein the fringe pattern includes a sinusoidal wave.

6. The wearable goggle of claim 1, wherein the one or more processors are further configured to:

construct a model of the at least one finger based on the identified pixels that correspond to the at least one finger and the tracked motion of the identified pixels that correspond to the at least one finger, wherein the constructing of the model includes constructing a 3D model of the at least one finger, including a position and a shape of the at least one finger, to geometrically determine whether the at least one finger corresponds to an object of interest; and wherein at least one light source is positioned such that objects of interest are located within a proximal zone of a field of view of a camera responsible for the plurality of digital images, the proximal zone extending from the camera to a distance that is half or less than a distance to the background.

7. The wearable goggle of claim 6, wherein the holographic diffraction grating is associated with a holographic virtual reality/augmented reality (VR/AR) optics logic.

8. The wearable goggle of claim 7, wherein the holographic VR/AR optics logic is configured to:

generate a holographic image including, at least, the 3D model of the at least one finger; and present, towards a user, the holographic image via a display of the wearable goggle.

9. The wearable goggle of claim 8, wherein the holographic VR/AR optics logic is further configured to:

generate a holographic image including at least one transparent region within the holographic image, wherein a transparency of a region is based on at least one of (i) a wavelength and (ii) an angle associated with the interference distribution of the holographic diffraction grating; and present, towards the user, an AR scene via the display of the wearable goggle, the AR scene including, at least, the holographic image including at least one transparent region within the holographic image.

10. A method comprising:

obtaining an identification of pixels of a plurality of digital images, associated with a holographic diffraction grating, that correspond to at least one finger of a hand that is visible in the plurality of digital images rather than to a background in the plurality of digital images, the pixels being identified by:

obtaining, from the holographic diffraction grating, (i) a fringe pattern comprising an interference distribution of the holographic diffraction grating, wherein the fringe pattern provides a high contrast differential between the at least one finger and the background and (ii) a ghost silhouette; and identifying the pixels that correspond to the at least one finger based on at least one of the fringe pattern and the ghost silhouette; and tracking motion of the identified pixels that correspond to the at least one finger through the plurality of digital images.

11. The method of claim 10, wherein the method further includes:

constructing a model of the at least one finger based on the identified pixels that correspond to the at least one finger and the tracked motion of the identified pixels that correspond to the at least one finger, wherein the constructing of the model includes constructing a 3D model of the at least one finger, including a position and a shape of the at least one finger, to geometrically determine whether the at least one finger corresponds to an object of interest, and wherein at least one light source is positioned such that objects of interest are located within a proximal zone of a field of view of a camera responsible for the plurality of digital images, the proximal zone extending from the camera to a distance less than twice an expected maximum distance between the objects of interest and the camera.

12. The method of claim 11, wherein the method further includes:

generating a holographic image including, at least, the 3D model of the at least one finger; and presenting, towards a user, the holographic image via a display of a user device.

13. The method of claim 12, further including presenting, towards the user and via the display of the user device, a VR scene based on the holographic image.

14. The method of claim 12, further including presenting, towards the user and via the display of the user device, an AR scene based on the holographic image, wherein:

the holographic image includes at least one transparent region within the holographic image, and a transparency of a region is based on at least one of (i) a wavelength and (ii) an angle associated with the interference distribution of the holographic diffraction grating.

15. An image capture and analysis system comprising an image analyzer configured to:

obtain an identification of pixels of a plurality of digital images, associated with a holographic diffraction grating, that correspond to at least one finger of a hand that is visible in the plurality of digital images rather than to a background in the plurality of digital images, the pixels being identified by:

obtaining, from the holographic diffraction grating, (i) a fringe pattern comprising an interference distribution of the holographic diffraction grating, wherein the fringe pattern provides a high contrast differential between the at least one finger and the background and (ii) a ghost silhouette; and identifying the pixels that correspond to the at least one finger based on at least one of the fringe pattern and the ghost silhouette; and track motion of the identified pixels that correspond to the at least one finger through the plurality of digital images.

16. The image capture and analysis system of claim 15, wherein the image analyzer is further configured to:

construct a model of the at least one finger based on the identified pixels that correspond to the at least one finger and the tracked motion of the identified pixels that correspond to the at least one finger, wherein the constructing of the model includes constructing a 3D model of the at least one finger, including a position and a shape of the at least one finger, to geometrically determine whether the at least one finger corresponds to an object of interest, and wherein at least one light source is positioned such that objects of interest are located within a proximal zone of a field of view of a camera responsible for the plurality of digital images, the proximal zone extending from the camera to a distance less than twice an expected maximum distance between the objects of interest and the camera.

17. The image capture and analysis system of claim 16, further including a holographic virtual reality/augmented reality (VR/AR) optics logic, wherein the holographic VR/AR optics logic is configured to process data associated with the fringe pattern obtained from the holographic diffraction grating.

18. The image capture and analysis system of claim 17, wherein the holographic VR/AR optics logic is configured to:

generate a holographic image including, at least, the 3D model of the at least one finger; and present, towards a user, the holographic image via a display of a user device.

19. The image capture and analysis system of claim 18, wherein the holographic VR/AR optics logic is further configured to:

generate a holographic image including at least one transparent region within the holographic image, wherein a transparency of a region is based on at least one of (i) a wavelength and (ii) an angle associated with the interference distribution of the holographic diffraction grating; and present, towards the user, an AR scene via the display of the user device, the AR scene including, at least, the holographic image including at least one transparent region within the holographic image.

20. The image capture and analysis system of claim 18, wherein the holographic VR/AR optics logic is further configured to present, towards the user and via the display of the user device, a VR scene based on the holographic image.

* * * * *